(12) United States Patent
Davis et al.

(10) Patent No.: US 9,600,484 B2
(45) Date of Patent: Mar. 21, 2017

(54) SYSTEM AND METHOD FOR REPORTING AND ANALYSIS OF MEDIA CONSUMPTION DATA

(75) Inventors: Marc Eliot Davis, San Francisco, CA (US); Michael Spiegelman, Los Angeles, CA (US); Chris Kalaboukis, Los Gatos, CA (US); Ronald Martinez, San Francisco, CA (US); Nicola Stefano Ghezzi, Santa Monica, CA (US); Christopher T. Paretti, San Francisco, CA (US); Christopher William Higgins, Portland, OR (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 507 days.

(21) Appl. No.: 12/241,687

(22) Filed: Sep. 30, 2008

(65) Prior Publication Data

US 2010/0082688 A1 Apr. 1, 2010

(51) Int. Cl.
*G06F 17/30* (2006.01)

(52) U.S. Cl.
CPC .. *G06F 17/30041* (2013.01); *G06F 17/30044* (2013.01)

(58) Field of Classification Search
CPC ......... G06F 17/30867; G06F 17/30864; G06F 17/3087; G06F 17/30041; G06F 17/30044; G06F 17/30038
USPC ............... 707/790, E17.001, 736, 754, 789
See application file for complete search history.

(56) References Cited

U.S. PATENT DOCUMENTS

| | | |
|---|---|---|
| 5,446,891 A | 8/1995 | Kaplan et al. |
| 5,493,692 A | 2/1996 | Theimer et al. |
| 5,583,763 A | 12/1996 | Atcheson et al. |
| 5,651,068 A | 7/1997 | Klemba et al. |
| 5,761,662 A | 6/1998 | Dasan |
| 5,764,906 A | 6/1998 | Edelstein et al. |
| 5,781,879 A | 7/1998 | Arnold et al. |
| 5,784,365 A | 7/1998 | Ikeda |
| 5,794,210 A | 8/1998 | Goldhaber et al. |
| 5,802,510 A | 9/1998 | Jones |

(Continued)

FOREIGN PATENT DOCUMENTS

| | | |
|---|---|---|
| EP | 1362302 | 11/2003 |
| JP | 2002312559 | 10/2002 |

(Continued)

OTHER PUBLICATIONS

U.S. Appl. No. 11/593,668, filed Nov. 6, 2006 for Naaman, et al.
(Continued)

*Primary Examiner* — Shiow-Jy Fan
(74) *Attorney, Agent, or Firm* — James J. DeCarlo; Greenberg Traurig, LLP

(57) ABSTRACT

A system and method for reporting and analysis of media consumption data. A request is received over a network from a requesting user for consumption data relating to at least one media object, the request comprising an identification of the media objects. Spatial, temporal, topical, and social data available to the network relating to consumption of the media object are retrieved using a global index of data available to the network. The spatial, temporal, topical, and social data available to the network relating to consumption of the media objects are transmitted, over the network to the requesting user.

42 Claims, 11 Drawing Sheets

(56) References Cited

U.S. PATENT DOCUMENTS

| | | |
|---|---|---|
| 5,835,087 A | 11/1998 | Herz et al. |
| 5,903,848 A | 5/1999 | Takahashi |
| 5,920,854 A | 7/1999 | Kirsch et al. |
| 6,014,638 A | 1/2000 | Burge et al. |
| 6,021,403 A | 2/2000 | Horvitz et al. |
| 6,029,004 A * | 2/2000 | Bortnikov et al. ........... 717/158 |
| 6,047,234 A | 4/2000 | Cherveny et al. |
| 6,098,065 A | 8/2000 | Skillen et al. |
| 6,112,181 A | 8/2000 | Shear et al. |
| 6,157,924 A | 12/2000 | Austin |
| 6,169,992 B1 | 1/2001 | Beall et al. |
| 6,212,552 B1 | 4/2001 | Biliris et al. |
| 6,266,667 B1 | 7/2001 | Olsson |
| 6,314,365 B1 | 11/2001 | Smith |
| 6,314,399 B1 | 11/2001 | Deligne et al. |
| 6,324,519 B1 | 11/2001 | Eldering |
| 6,327,590 B1 | 12/2001 | Chidlovskii et al. |
| 6,446,065 B1 | 9/2002 | Nishioka et al. |
| 6,490,698 B1 | 12/2002 | Horvitz et al. |
| 6,502,033 B1 | 12/2002 | Phuyal |
| 6,523,172 B1 | 2/2003 | Martinez-Guerra et al. |
| 6,571,279 B1 | 5/2003 | Herz et al. |
| 6,601,012 B1 | 7/2003 | Horvitz et al. |
| 6,662,195 B1 | 12/2003 | Langseth et al. |
| 6,665,640 B1 | 12/2003 | Bennett et al. |
| 6,694,316 B1 | 2/2004 | Langseth et al. |
| 6,701,311 B2 | 3/2004 | Biebesheimer et al. |
| 6,701,315 B1 | 3/2004 | Austin |
| 6,708,203 B1 | 3/2004 | Makar et al. |
| 6,731,940 B1 | 5/2004 | Nagendran |
| 6,741,980 B1 | 5/2004 | Langseth et al. |
| 6,757,661 B1 | 6/2004 | Blaser et al. |
| 6,773,344 B1 | 8/2004 | Gabai et al. |
| 6,781,920 B2 | 8/2004 | Bates et al. |
| 6,785,670 B1 | 8/2004 | Chiang et al. |
| 6,789,073 B1 | 9/2004 | Lunenfeld |
| 6,813,501 B2 | 11/2004 | Kinnunen et al. |
| 6,816,850 B2 | 11/2004 | Culliss |
| 6,829,333 B1 | 12/2004 | Frazier |
| 6,834,195 B2 | 12/2004 | Brandenberg et al. |
| 6,842,761 B2 | 1/2005 | Diamond et al. |
| 6,845,370 B2 | 1/2005 | Burkey et al. |
| 6,850,252 B1 | 2/2005 | Hoffberg |
| 6,853,913 B2 | 2/2005 | Cherveny et al. |
| 6,853,982 B2 | 2/2005 | Smith et al. |
| 6,882,977 B1 | 4/2005 | Miller |
| 6,904,160 B2 | 6/2005 | Burgess |
| 6,931,254 B1 | 8/2005 | Egner et al. |
| 6,961,660 B2 | 11/2005 | Underbrink et al. |
| 6,961,731 B2 | 11/2005 | Holbrook |
| 6,985,839 B1 | 1/2006 | Motamedi et al. |
| 7,010,492 B1 | 3/2006 | Bassett et al. |
| 7,027,801 B1 | 4/2006 | Hall et al. |
| 7,058,508 B2 | 6/2006 | Combs et al. |
| 7,058,626 B1 | 6/2006 | Pan et al. |
| 7,062,510 B1 | 6/2006 | Eldering |
| 7,065,345 B2 | 6/2006 | Carlton et al. |
| 7,065,483 B2 | 6/2006 | Decary et al. |
| 7,069,308 B2 | 6/2006 | Abrams |
| 7,073,129 B1 | 7/2006 | Robarts et al. |
| 7,110,776 B2 | 9/2006 | Sambin |
| 7,143,091 B2 | 11/2006 | Charnock et al. |
| 7,149,696 B2 | 12/2006 | Shimizu et al. |
| 7,181,438 B1 | 2/2007 | Szabo |
| 7,185,286 B2 | 2/2007 | Zondervan et al. |
| 7,194,512 B1 | 3/2007 | Creemer et al. |
| 7,203,597 B2 | 4/2007 | Sato et al. |
| 7,209,915 B1 | 4/2007 | Taboada et al. |
| 7,219,013 B1 | 5/2007 | Young et al. |
| 7,236,969 B1 | 6/2007 | Skillen et al. |
| 7,254,581 B2 | 8/2007 | Johnson et al. |
| 7,257,570 B2 | 8/2007 | Riise et al. |
| 7,305,445 B2 | 12/2007 | Singh et al. |
| 7,320,025 B1 | 1/2008 | Steinberg et al. |
| 7,343,364 B2 | 3/2008 | Bram et al. |
| 7,395,507 B2 | 7/2008 | Robarts et al. |
| 7,404,084 B2 | 7/2008 | Fransdonk |
| 7,437,312 B2 | 10/2008 | Bhatia et al. |
| 7,451,102 B2 | 11/2008 | Nowak |
| 7,461,168 B1 | 12/2008 | Wan |
| 7,496,548 B1 | 2/2009 | Ershov |
| 7,522,995 B2 | 4/2009 | Nortrup |
| 7,529,811 B2 | 5/2009 | Thompson |
| 7,562,122 B2 | 7/2009 | Oliver et al. |
| 7,577,665 B2 | 8/2009 | Rameer et al. |
| 7,584,215 B2 | 9/2009 | Saari et al. |
| 7,624,104 B2 | 11/2009 | Berkhin et al. |
| 7,624,146 B1 | 11/2009 | Brogne et al. |
| 7,634,465 B2 | 12/2009 | Sareen et al. |
| 7,657,907 B2 | 2/2010 | Fennan et al. |
| 7,681,147 B2 | 3/2010 | Richardson-Bunbury et al. |
| 7,725,492 B2 | 5/2010 | Sittig et al. |
| 7,729,901 B2 | 6/2010 | Richardson-Bunbury et al. |
| 7,769,740 B2 | 8/2010 | Martinez |
| 7,769,745 B2 | 8/2010 | Mor Naaman |
| 7,783,622 B1 | 8/2010 | Vandermolen et al. |
| 7,792,040 B2 | 9/2010 | Nair |
| 7,802,724 B1 | 9/2010 | Nohr |
| 7,822,871 B2 | 10/2010 | Stolorz et al. |
| 7,831,586 B2 | 11/2010 | Reitter et al. |
| 7,865,308 B2 | 1/2011 | Athsani |
| 7,925,708 B2 | 4/2011 | Davis |
| 2001/0013009 A1 | 8/2001 | Greening et al. |
| 2001/0035880 A1 | 11/2001 | Musatov et al. |
| 2001/0047384 A1 | 11/2001 | Croy |
| 2001/0052058 A1 | 12/2001 | Ohran |
| 2002/0014742 A1 | 2/2002 | Conte et al. |
| 2002/0019849 A1 | 2/2002 | Tuvey et al. |
| 2002/0019857 A1 | 2/2002 | Harjanto |
| 2002/0023091 A1 | 2/2002 | Silberberg et al. |
| 2002/0023230 A1 | 2/2002 | Bolnick et al. |
| 2002/0035605 A1 | 3/2002 | McDowell et al. |
| 2002/0049968 A1 | 4/2002 | Wilson et al. |
| 2002/0052785 A1 | 5/2002 | Tenenbaum |
| 2002/0052786 A1 | 5/2002 | Kim et al. |
| 2002/0054089 A1 | 5/2002 | Nicholas |
| 2002/0065844 A1 | 5/2002 | Robinson et al. |
| 2002/0069218 A1 | 6/2002 | Sull et al. |
| 2002/0099695 A1 | 7/2002 | Abajian et al. |
| 2002/0103870 A1 | 8/2002 | Shouji |
| 2002/0111956 A1 | 8/2002 | Yeo et al. |
| 2002/0112035 A1 | 8/2002 | Carey |
| 2002/0133400 A1 | 9/2002 | Terry et al. |
| 2002/0138331 A1 | 9/2002 | Hosea et al. |
| 2002/0152267 A1 | 10/2002 | Lennon |
| 2002/0169840 A1 | 11/2002 | Sheldon et al. |
| 2002/0173971 A1 | 11/2002 | Stirpe et al. |
| 2002/0178161 A1 | 11/2002 | Brezin et al. |
| 2002/0198786 A1 * | 12/2002 | Tripp et al. .................... 705/26 |
| 2003/0008661 A1 | 1/2003 | Joyce et al. |
| 2003/0009367 A1 | 1/2003 | Morrison |
| 2003/0009495 A1 | 1/2003 | Adjaoute |
| 2003/0027558 A1 | 2/2003 | Eisinger |
| 2003/0032409 A1 | 2/2003 | Hutcheson et al. |
| 2003/0033331 A1 | 2/2003 | Sena et al. |
| 2003/0033394 A1 | 2/2003 | Stine et al. |
| 2003/0065762 A1 | 4/2003 | Stolorz et al. |
| 2003/0069877 A1 | 4/2003 | Grefenstette et al. |
| 2003/0069880 A1 | 4/2003 | Harrison et al. |
| 2003/0078978 A1 | 4/2003 | Lardin et al. |
| 2003/0080992 A1 | 5/2003 | Haines |
| 2003/0126250 A1 | 7/2003 | Jhanji |
| 2003/0149574 A1 | 8/2003 | Rudman |
| 2003/0154293 A1 | 8/2003 | Zmolek |
| 2003/0165241 A1 | 9/2003 | Fransdonk |
| 2003/0191816 A1 | 10/2003 | Landress et al. |
| 2004/0010492 A1 | 1/2004 | Zhao et al. |
| 2004/0015588 A1 | 1/2004 | Cotte |
| 2004/0030798 A1 | 2/2004 | Andersson et al. |
| 2004/0034752 A1 | 2/2004 | Ohran |
| 2004/0043758 A1 | 3/2004 | Sorvari et al. |
| 2004/0044736 A1 | 3/2004 | Austin-Lane et al. |
| 2004/0070602 A1 | 4/2004 | Kobuya et al. |
| 2004/0139025 A1 | 7/2004 | Coleman |

(56) References Cited

U.S. PATENT DOCUMENTS

| | | |
|---|---|---|
| 2004/0139047 A1 | 7/2004 | Rechsteiner |
| 2004/0148341 A1 | 7/2004 | Cotte |
| 2004/0152477 A1 | 8/2004 | Wu et al. |
| 2004/0183829 A1 | 9/2004 | Kontny et al. |
| 2004/0199527 A1* | 10/2004 | Morain et al. ................ 707/100 |
| 2004/0201683 A1 | 10/2004 | Murashita et al. |
| 2004/0203851 A1 | 10/2004 | Vetro et al. |
| 2004/0203909 A1 | 10/2004 | Koster |
| 2004/0209602 A1 | 10/2004 | Joyce et al. |
| 2004/0243623 A1 | 12/2004 | Ozer et al. |
| 2004/0260804 A1 | 12/2004 | Grabarnik et al. |
| 2004/0267880 A1 | 12/2004 | Patiejunas |
| 2005/0005242 A1 | 1/2005 | Hoyle |
| 2005/0015451 A1 | 1/2005 | Sheldon et al. |
| 2005/0015599 A1 | 1/2005 | Wang et al. |
| 2005/0050027 A1 | 3/2005 | Yeh |
| 2005/0050043 A1 | 3/2005 | Pyhalammi et al. |
| 2005/0055321 A1 | 3/2005 | Fratkina |
| 2005/0060381 A1 | 3/2005 | Huynh et al. |
| 2005/0065950 A1 | 3/2005 | Chaganti et al. |
| 2005/0065980 A1 | 3/2005 | Hyatt et al. |
| 2005/0076060 A1 | 4/2005 | Finn et al. |
| 2005/0086187 A1 | 4/2005 | Grosser et al. |
| 2005/0105552 A1 | 5/2005 | Osterling |
| 2005/0108213 A1 | 5/2005 | Riise et al. |
| 2005/0120006 A1 | 6/2005 | Nye |
| 2005/0131727 A1 | 6/2005 | Sezan |
| 2005/0149397 A1 | 7/2005 | Morgernstern et al. |
| 2005/0151849 A1 | 7/2005 | Fitzhugh et al. |
| 2005/0159220 A1 | 7/2005 | Wilson et al. |
| 2005/0159970 A1 | 7/2005 | Buyukkokten et al. |
| 2005/0160080 A1 | 7/2005 | Dawson |
| 2005/0165699 A1 | 7/2005 | Hahn-Carlson |
| 2005/0166240 A1 | 7/2005 | Kim |
| 2005/0171955 A1 | 8/2005 | Hull et al. |
| 2005/0177385 A1 | 8/2005 | Hull et al. |
| 2005/0182824 A1 | 8/2005 | Cotte |
| 2005/0183110 A1 | 8/2005 | Anderson |
| 2005/0187786 A1 | 8/2005 | Tsai |
| 2005/0192025 A1 | 9/2005 | Kaplan |
| 2005/0203801 A1 | 9/2005 | Morgenstern et al. |
| 2005/0216295 A1 | 9/2005 | Abrahamsohn |
| 2005/0216300 A1 | 9/2005 | Appelman et al. |
| 2005/0219375 A1 | 10/2005 | Hasegawa et al. |
| 2005/0234781 A1 | 10/2005 | Morgenstern |
| 2005/0273510 A1 | 12/2005 | Schuh |
| 2005/0283753 A1* | 12/2005 | Ho et al. ................ 717/102 |
| 2006/0020631 A1 | 1/2006 | Cheong Wan et al. |
| 2006/0026013 A1 | 2/2006 | Kraft |
| 2006/0026067 A1 | 2/2006 | Nicholas et al. |
| 2006/0031108 A1 | 2/2006 | Oran |
| 2006/0040719 A1 | 2/2006 | Plimi |
| 2006/0047563 A1 | 3/2006 | Wardell |
| 2006/0047615 A1 | 3/2006 | Ravin |
| 2006/0053058 A1 | 3/2006 | Hotchkiss et al. |
| 2006/0069612 A1 | 3/2006 | Hurt et al. |
| 2006/0069616 A1 | 3/2006 | Bau |
| 2006/0069749 A1 | 3/2006 | Herz et al. |
| 2006/0074853 A1 | 4/2006 | Liu et al. |
| 2006/0085392 A1 | 4/2006 | Wang et al. |
| 2006/0085419 A1 | 4/2006 | Rosen |
| 2006/0089876 A1 | 4/2006 | Boys |
| 2006/0116924 A1 | 6/2006 | Angeles et al. |
| 2006/0123053 A1 | 6/2006 | Scannell, Jr. |
| 2006/0129313 A1 | 6/2006 | Becker |
| 2006/0129605 A1 | 6/2006 | Doshi |
| 2006/0161894 A1 | 7/2006 | Oustiougov et al. |
| 2006/0168591 A1 | 7/2006 | Hunsinger et al. |
| 2006/0173838 A1 | 8/2006 | Garg et al. |
| 2006/0173985 A1 | 8/2006 | Moore |
| 2006/0178822 A1 | 8/2006 | Lee |
| 2006/0184508 A1 | 8/2006 | Fuselier et al. |
| 2006/0184579 A1 | 8/2006 | Mills |
| 2006/0212330 A1 | 9/2006 | Savilampi |
| 2006/0212401 A1 | 9/2006 | Amerally et al. |
| 2006/0227945 A1 | 10/2006 | Runge et al. |
| 2006/0235816 A1 | 10/2006 | Yang et al. |
| 2006/0236257 A1 | 10/2006 | Othmer et al. |
| 2006/0242139 A1 | 10/2006 | Butterfield et al. |
| 2006/0242178 A1 | 10/2006 | Butterfield et al. |
| 2006/0242259 A1 | 10/2006 | Vallath et al. |
| 2006/0258368 A1 | 11/2006 | Granito et al. |
| 2006/0282455 A1 | 12/2006 | Lee |
| 2006/0287910 A1* | 12/2006 | Kuchar et al. ................ 705/10 |
| 2007/0013560 A1 | 1/2007 | Casey |
| 2007/0015519 A1 | 1/2007 | Casey |
| 2007/0043766 A1 | 2/2007 | Nicholas et al. |
| 2007/0067104 A1 | 3/2007 | Mays |
| 2007/0067267 A1 | 3/2007 | Ives |
| 2007/0072591 A1 | 3/2007 | McGary et al. |
| 2007/0073583 A1 | 3/2007 | Grouf et al. |
| 2007/0073641 A1 | 3/2007 | Perry et al. |
| 2007/0086061 A1 | 4/2007 | Robbins |
| 2007/0087756 A1 | 4/2007 | Hoffberg |
| 2007/0088852 A1 | 4/2007 | Levkovitz |
| 2007/0100956 A1 | 5/2007 | Kumar |
| 2007/0112762 A1 | 5/2007 | Brubaker |
| 2007/0121843 A1 | 5/2007 | Atazky et al. |
| 2007/0130137 A1 | 6/2007 | Oliver et al. |
| 2007/0136048 A1 | 6/2007 | Richardson-Bunbury et al. |
| 2007/0136235 A1* | 6/2007 | Hess ................ 707/2 |
| 2007/0136256 A1 | 6/2007 | Kapur et al. |
| 2007/0136689 A1 | 6/2007 | Richardson-Bunbury et al. |
| 2007/0143345 A1 | 6/2007 | Jones et al. |
| 2007/0150168 A1 | 6/2007 | Balcom et al. |
| 2007/0150359 A1 | 6/2007 | Lim et al. |
| 2007/0155411 A1 | 7/2007 | Morrison |
| 2007/0161382 A1 | 7/2007 | Melinger et al. |
| 2007/0162850 A1 | 7/2007 | Adler |
| 2007/0168430 A1 | 7/2007 | Brun et al. |
| 2007/0173266 A1 | 7/2007 | Barnes |
| 2007/0179792 A1 | 8/2007 | Kramer |
| 2007/0185599 A1 | 8/2007 | Robinson et al. |
| 2007/0192299 A1 | 8/2007 | Zuckerberg et al. |
| 2007/0198506 A1 | 8/2007 | Attaran Rezaei et al. |
| 2007/0198563 A1* | 8/2007 | Apparao et al. ................ 707/101 |
| 2007/0203591 A1 | 8/2007 | Bowerman |
| 2007/0219708 A1 | 9/2007 | Brasche et al. |
| 2007/0233585 A1 | 10/2007 | Ben Simon et al. |
| 2007/0239348 A1 | 10/2007 | Cheung |
| 2007/0239517 A1 | 10/2007 | Chung et al. |
| 2007/0259653 A1 | 11/2007 | Tang et al. |
| 2007/0260508 A1 | 11/2007 | Barry et al. |
| 2007/0260604 A1 | 11/2007 | Haeuser et al. |
| 2007/0271297 A1* | 11/2007 | Jaffe et al. ................ 707/104.1 |
| 2007/0271340 A1 | 11/2007 | Goodman et al. |
| 2007/0273758 A1 | 11/2007 | Mendoza et al. |
| 2007/0276940 A1 | 11/2007 | Abraham et al. |
| 2007/0282621 A1 | 12/2007 | Altman et al. |
| 2007/0282675 A1 | 12/2007 | Varghese |
| 2007/0288278 A1 | 12/2007 | Alexander et al. |
| 2008/0005313 A1 | 1/2008 | Flake et al. |
| 2008/0005651 A1 | 1/2008 | Grefenstette et al. |
| 2008/0010206 A1 | 1/2008 | Coleman |
| 2008/0021957 A1 | 1/2008 | Medved et al. |
| 2008/0026804 A1 | 1/2008 | Baray et al. |
| 2008/0028031 A1 | 1/2008 | Bailey et al. |
| 2008/0040283 A1 | 2/2008 | Morris |
| 2008/0046298 A1 | 2/2008 | Ben-Yehuda et al. |
| 2008/0070588 A1 | 3/2008 | Morin |
| 2008/0086356 A1 | 4/2008 | Glassman et al. |
| 2008/0086431 A1 | 4/2008 | Robinson et al. |
| 2008/0091471 A1* | 4/2008 | Michon ................ G06F 19/3443 705/3 |
| 2008/0091796 A1 | 4/2008 | Story et al. |
| 2008/0096664 A1 | 4/2008 | Baray et al. |
| 2008/0102911 A1 | 5/2008 | Campbell et al. |
| 2008/0104061 A1 | 5/2008 | Rezaei |
| 2008/0104227 A1 | 5/2008 | Birnie et al. |
| 2008/0109761 A1 | 5/2008 | Stambaugh |
| 2008/0109843 A1 | 5/2008 | Ullah |
| 2008/0114751 A1 | 5/2008 | Cramer et al. |
| 2008/0120183 A1 | 5/2008 | Park |
| 2008/0120308 A1* | 5/2008 | Martinez et al. ................ 707/100 |

(56) References Cited

U.S. PATENT DOCUMENTS

| | | | |
|---|---|---|---|
| 2008/0120690 A1 | 5/2008 | Norlander et al. | |
| 2008/0133750 A1 | 6/2008 | Grabarnik et al. | |
| 2008/0147655 A1 | 6/2008 | Sinha et al. | |
| 2008/0147743 A1 | 6/2008 | Taylor et al. | |
| 2008/0148175 A1 | 6/2008 | Naaman et al. | |
| 2008/0154720 A1 | 6/2008 | Gounares et al. | |
| 2008/0163284 A1 | 7/2008 | Martinez et al. | |
| 2008/0172632 A1 | 7/2008 | Stambaugh | |
| 2008/0177706 A1 | 7/2008 | Yuen | |
| 2008/0270579 A1 | 10/2008 | Herz et al. | |
| 2008/0285886 A1 | 11/2008 | Allen | |
| 2008/0301250 A1 | 12/2008 | Hardy et al. | |
| 2008/0320001 A1 | 12/2008 | Gaddam | |
| 2009/0005987 A1 | 1/2009 | Vengroff et al. | |
| 2009/0006336 A1 | 1/2009 | Forstall et al. | |
| 2009/0012934 A1 | 1/2009 | Yerigan | |
| 2009/0012965 A1 | 1/2009 | Franken | |
| 2009/0043844 A1 | 2/2009 | Zimmet et al. | |
| 2009/0044132 A1 | 2/2009 | Combel et al. | |
| 2009/0063254 A1 | 3/2009 | Paul et al. | |
| 2009/0070186 A1 | 3/2009 | Buiten et al. | |
| 2009/0073191 A1 | 3/2009 | Smith et al. | |
| 2009/0076889 A1 | 3/2009 | Jhanji | |
| 2009/0100052 A1 | 4/2009 | Stern et al. | |
| 2009/0106356 A1 | 4/2009 | Brase et al. | |
| 2009/0125517 A1 | 5/2009 | Krishnaswamy et al. | |
| 2009/0132941 A1 | 5/2009 | Pilskalns et al. | |
| 2009/0144141 A1 | 6/2009 | Dominowska et al. | |
| 2009/0144256 A1* | 6/2009 | Cases et al. | 707/5 |
| 2009/0150501 A1 | 6/2009 | Davis et al. | |
| 2009/0150507 A1 | 6/2009 | Davis et al. | |
| 2009/0165051 A1 | 6/2009 | Armaly | |
| 2009/0171939 A1 | 7/2009 | Athsani et al. | |
| 2009/0177603 A1 | 7/2009 | Honisch | |
| 2009/0187637 A1 | 7/2009 | Wu et al. | |
| 2009/0204484 A1 | 8/2009 | Johnson | |
| 2009/0204672 A1 | 8/2009 | Jetha et al. | |
| 2009/0204676 A1 | 8/2009 | Parkinson et al. | |
| 2009/0216606 A1 | 8/2009 | Coffman et al. | |
| 2009/0222302 A1 | 9/2009 | Higgins | |
| 2009/0222303 A1 | 9/2009 | Higgins | |
| 2009/0234814 A1 | 9/2009 | Boerries et al. | |
| 2009/0234909 A1 | 9/2009 | Strandeil et al. | |
| 2009/0249482 A1 | 10/2009 | Sarathy | |
| 2009/0265431 A1 | 10/2009 | Janie et al. | |
| 2009/0281997 A1 | 11/2009 | Jain | |
| 2009/0299837 A1 | 12/2009 | Steelberg et al. | |
| 2009/0313546 A1 | 12/2009 | Katpelly et al. | |
| 2009/0320047 A1 | 12/2009 | Khan et al. | |
| 2009/0323519 A1 | 12/2009 | Pun | |
| 2009/0328087 A1 | 12/2009 | Higgins et al. | |
| 2010/0002635 A1 | 1/2010 | Eklund | |
| 2010/0014444 A1 | 1/2010 | Ghanadan et al. | |
| 2010/0063993 A1 | 3/2010 | Higgins et al. | |
| 2010/0070368 A1 | 3/2010 | Choi et al. | |
| 2010/0118025 A1* | 5/2010 | Smith et al. | 345/418 |
| 2010/0125563 A1 | 5/2010 | Nair et al. | |
| 2010/0125569 A1 | 5/2010 | Nair et al. | |
| 2010/0125604 A1 | 5/2010 | Martinez et al. | |
| 2010/0125605 A1 | 5/2010 | Nair et al. | |
| 2010/0185642 A1 | 7/2010 | Higgins et al. | |

FOREIGN PATENT DOCUMENTS

| | | |
|---|---|---|
| KR | 1020000036897 | 7/2000 |
| KR | 1020000054319 | 9/2000 |
| KR | 10-2000-0064105 | 11/2000 |
| KR | 1020030049173 | 6/2003 |
| KR | 10-0801662 | 2/2005 |
| KR | 1020060043333 | 5/2006 |
| KR | 102007034094 | 3/2007 |
| KR | 1020070073180 | 7/2007 |
| KR | 1020080048802 | 6/2008 |
| WO | WO2006/116196 | 11/2006 |
| WO | WO 2007/022137 | 2/2007 |
| WO | WO 2007/027453 | 3/2007 |
| WO | WO 2007070358 | 6/2007 |
| WO | WO2007113546 | 10/2007 |

OTHER PUBLICATIONS

U.S. Appl. No. 11/593,869, filed Nov. 6, 2006 for Naaman, et al.

"Gutenkarte" Book Catalog, 2006 MetaCarta, Inc., www.gutenkarte.org 11pgs.

Baron, N.S. et al. (Aug. 30, 2005). "Tethered or Mobile? Use of Away Messages in Instant Messaging by American College Students," Chapter 20.1 in Mobile Communication, Springer: London, England, 31:293-297.

Jones, C. et al. (2004). "Ad-Hoc Meeting System," Final Presentation from Project Group #7, SIMS 202, Fall 2004 Class, UC Berkley School of Information Management & Systems, located at <http://www2.sims.berkeley.edu/academics/courses/is202/f04/phone_project/Group7/ >, last visited on Feb. 2, 2010, thirteen pages.

Manguy, L. et al. (2006). "iTour—Packing the World Into Your Mobile Device," Final Presentation from Project Group #6, SIMS 202, Fall 2004 Class, UC Berkley School of Information Management & Systems, located at <http://www2.sims.berkeley.edu/academics/courses/is202/f04/phone_project/Group6/index.h > . . . , last visited on Feb. 2, 2010, ten pages.

Mitnick, S. et al. (2004). "Pillbox," Final Presentation from Project Group #8, SIMS: 02: Fall 2004 Class, UC Berkley School of Information Management & Systems, located at <http://www2.sims.berkeley.edu/academics/courses/is202/f04/phone_project/Group8/about.p . . . ,> last visited on Feb. 2, 2010, seventeen pages.

Wooldridge, M. et al. (2005). "STALK. The Camera-phone Scavenger Hunt!" located at <http://www.stalk.com >, last visited on Dec. 28, 2009, two pages.

www.stalk.com (retrieved on Dec. 29, 2009) pp. 1-2.

Anonymous. (Date Unknown). "CommunityWalk—About," located at <http://www.communitywalk.com/about >, last visited on Mar. 3, 2008, one page.

Anonymous. (Date Unknown). "CommunityWalk Mapping Made Easy," located at <http://www.communitywalk.com/>, last visited on Mar. 3, 2008, one page.

Anonymous. (Date Unknown). "Google Earth User Guide" located at <http://earth.google.com/userguide/v4/>, last visited on Feb. 27, 2008, twelve pages.

Anonymous. (Date Unknown). "Google Earth—Wikipedia, the Free Encyclopedia," located at <http://en.wikipedia.org/wiki/Google_earth >, last visited on Mar. 3, 2008, fourteen pages.

Anonymous. (Date Unknown). "Google Earth User Guide—Using Image Overlays and 3D Models," located at <http://earth.google.com/userguide/v4/ug_imageoverlays.html >, nine pages.

Anonymous. (Date Unknown). "Google Maps," located at <http://en.wikipedia.org/wiki/Google_maps >, last visited on Feb. 27, 2008, eleven pages.

Anonymous. (Date Unknown). "Live Search Maps," located at <http://en.wikipedia.org/wiki/Windows_live_maps >, last visited on Mar. 3, 2008, six pages.

Anonymous. (Date Unknown). "WikiMapia," located at <http://en.wikipedia.org/wiki/WikiMapia >, last visited on Mar. 3, 2008, three pages.

Anonymous. (2007). "Ask.com Maps & Directions," located at <http://maps.ask.com/maps >, last visited on Mar. 3, 2008, one page.

Anonymous. (2007). "Wayfaring Follow You, Follow Me," located at <http://www.wayfaring.com/>, last visited on Mar. 3, 2008, three pages.

Anonymous. (2008). "Platial the People's Atlas," located at <www.platial.com >, last visited on Mar. 3, 2008, one page.

Anonymous. (2008). "Wikimpaia.org ," located at <http://wikimpaia.org/>, last visited on Mar. 3, 2008, one page.

U.S. Appl. No. 12/273,259, filed Dec. 6, 2007, Davis.

U.S. Appl. No. 11/958,157, filed Dec. 17, 2007, Hayashi.

U.S. Appl. No. 11/952,875, filed Dec. 7, 2007, Davis.

U.S. Appl. No. 11/960,368, filed Dec. 19, 2007, Madsen.

(56) References Cited

OTHER PUBLICATIONS

U.S. Appl. No. 11/952,007, filed Dec. 6, 2007, Davis.
U.S. Appl. No. 11/953,454, filed Dec. 10, 2007, Davis.
U.S. Appl. No. 11/953,494, filed Dec. 10, 2007, Davis.
U.S. Appl. No. 12/059,594, filed Mar. 31, 2008, Martinez.
U.S. Appl. No. 12/236,668, filed Sep. 24, 2008, Davis.
U.S. Appl. No. 12/057,943, filed Mar. 28, 2008, Martinez.
U.S. Appl. No. 12/057,878, filed Mar. 28, 2008, Martinez.
U.S. Appl. No. 11/969,751, filed Jan. 4, 2008, Martinez.
U.S. Appl. No. 12/163,249, filed Jun. 27, 2008, Kalaboukis.
U.S. Appl. No. 12/145,145, filed Jun. 24, 2008, Davis.
U.S. Appl. No. 12/182,813, filed Jul. 30, 2008, Higgins.
U.S. Appl. No. 12/182,969, filed Jun. 27, 2008, Higgins.
U.S. Appl. No. 12/163,314, filed Jun. 27, 2008, Higgins.
U.S. Appl. No. 12/163,396, filed Jun. 27, 2008, Higgins.
U.S. Appl. No. 12/195,969, filed Aug. 21, 2008, Martinez.
U.S. Appl. No. 12/234,000, filed Sep. 19, 2008, Martinez.
U.S. Appl. No. 12/241,590, filed Sep. 30, 2008, Athsani.
U.S. Appl. No. 12/206,172, filed Sep. 8, 2008, Higgins.
U.S. Appl. No. 12/273,291, filed Nov. 18, 2008, Nair.
U.S. Appl. No. 12/273,317, filed Nov. 18, 2008, Nair.
U.S. Appl. No. 12/273,345, filed Nov. 18, 2008, Nair.
U.S. Appl. No. 12/273,371, filed Nov. 18, 2008, Nair.
U.S. Appl. No. 12/241,198, filed Sep. 30, 2008, Higgins.
U.S. Appl. No. 12/339,355, filed Dec. 19, 2008, Higgins.
U.S. Appl. No. 12/329,038, filed Dec. 5, 2008, Higgins.
U.S. Appl. No. 12/326,553, filed Dec. 2, 2008, Churchill.
U.S. Appl. No. 12/242,656, filed Sep. 30, 2008, Burgener.
U.S. Appl. No. 12/357,311, filed Jan. 21, 2009, Higgins.
U.S. Appl. No. 12/357,332, filed Jan. 21, 2009, Higgins.
U.S. Appl. No. 12/357,345, filed Jan. 21, 2009, Higgins.
U.S. Appl. No. 12/357,285, filed Jan. 21, 2009, Higgins.
U.S. Appl. No. 12/409,867, filed Mar. 24, 2009, King.
U.S. Appl. No. 12/540,098, filed Aug. 12, 2009, Martinez.
U.S. Appl. No. 12/536,892, filed Aug. 6, 2009, King.
U.S. Appl. No. 12/540,588, filed Aug. 13, 2009, Tendjoukian.
U.S. Appl. No. 12/015,115, filed Jan. 16, 2006, Higgins.
U.S. Appl. No. 12/180,486, filed Jul. 25, 2008, Higgins.
U.S. Appl. No. 12/180,499, filed Jul. 25, 2008, Higgins.
U.S. Appl. No. 12/015,146, filed Jan. 16, 2008, Higgins.
U.S. Appl. No. 12/041,088, filed Mar. 3, 2008, Higgins.
U.S. Appl. No. 12/041,062, filed Mar. 3, 2008, Higgins.
U.S. Appl. No. 12/041,054, filed Mar. 3, 2008, Higgins.
U.S. Appl. No. 12/540,269, filed Aug. 12, 2009, Kalaboukis.
U.S. Appl. No. 11/969,815, filed Jan. 4, 2004, Davis.
U.S. Appl. No. 12/182,111, filed Jul. 29, 2008, Davis.
U.S. Appl. No. 12/434,575, filed May 1, 2009, O'Sullivan.
U.S. Appl. No. 12/434,580, filed May 1, 2009, O'Sullivan.
U.S. Appl. No. 12/407,690, filed Mar. 19, 2009, Davis.
U.S. Appl. No. 12/407,681, filed Mar. 19, 2009, Athsani.
International Search Report (PCT/US2009/030405) dated Sep. 23, 2009; 2 pages.
U.S. Appl. No. 12/041,054 file history dated Mar. 3, 2008; 64 pgs.
U.S. Appl. No. 12/041,062 file history dated Mar. 3, 2008; 66 pgs.
U.S. Appl. No. 12/041,088 file history dated Mar. 3, 2008; 66 pgs.
U.S. Appl. No. 12/169,931 file history dated Jul. 9, 2008; 66 pgs.
U.S. Appl. No. 12/170,025 file history dated Jul. 9, 2008; 67 pgs.
U.S. Appl. No. 12/180,499 file history dated Jul. 25, 2008; 67 pgs.
U.S. Appl. No. 12/180,486 file history dated Jul. 25, 2008; 65 pgs.
International Search Report PCT/US2009/030406 dated Sep. 29, 2009; 5 pages.
International Search Report and Written Opinion PCT/US2009/034445 dated Oct. 12, 2009; 7 pages.
Office Action U.S. Appl. No. 12/041,054 dated Oct. 27, 2010; 15 pages.
Office Action U.S. Appl. No. 12/041,062 dated Oct. 28, 2010; 12 pages.
International Search Report PCT/US2009/034444 dated Sep. 18, 2009; 2 pages.
Office Action U.S. Appl. No. 12/041,088 dated Oct. 4, 2010; 18 pages.
Almieda, R.B. et al. "A Community-Aware Search Engine," WWW2004, New York., NY, May 17-22, 2004, pp. 413-421.
Anonymous. (Jul. 16, 2006). MyFantasyLeague Fantasy Football League Management—Features, located at <http://web.archive.org/web/20060716072900/www.myfantasyleague.com/features.htm >, last visited on Feb. 10, 2009, four pages.
Anonymous. (Jul. 17, 2006). "Fantasy Football Lineup Analyzer—Tips for Who to Start & Who to Bench each Week," located at http://web.archive.org/web/200607171633529/www.fantasyfootballstarters.com/lineupAnalyzer.jsp>, last visited on Feb. 10, 2009, one page.
Bharat, K. (Date Unknown). "SearchPad: Explicit Capture of Search Context to Support Web Search," located at <http://www9.org/w9cdrom/173/173.html >, last visited Aug. 1, 2007, 13 pages.
Budzik, J. et al. (2000). "User Interactions with Everyday Applications as Context for Just-in-Time Information Access," Proceeding of the 2000 Conference on Intelligent User Interfaces, eight pages.
Finkelstein, L. et al. (2001). "Placing Search in Context: The Concept Revisited," WWW/O, Hong Kong, May 2-5, 2001, pp. 406-414.
Freyne, J. et al. (2004). "Further Experiments on Collaborative Ranking in Community-Based Web Search," Artificial Intelligence Review, pp. 1-23.
Lieberman, H. (1995) "Letizia: An Agent that Assists Web Browsing," Proceedings of the Fourteenth International Joint Conference on Artificial Intelligence, Aug. 20-25, 1995, six pages.
Mitra, M. et al. (1998). "Improving Automatic Query Expansion," Proceedings of the AMC SIGIR, nine pages.
Rhodes, B.J. et al. (1996). "Remembrance Agent: A Continuously Running Automated Information Retrieval System," Proceedings of the First International Conference on the Practical Application of Intelligent Agents and Multi Agent Technology (PAAM), pp. 487-495, located at <http://www.cc.gatech.edu/fac/Thad.Starner/p/032_40_agents&ubicomp/remembrance-agent . . . >, last visited Aug. 1, 2007, six pages.
Sansbury, C. (Sep. 13, 2005). "Yahoo! Widget for BBC Sports News—Scotland," 32. located at <http://widgets.yahoo.com/gallery/view.php?widget=37220 >, last visited on Feb. 7, 2007, one page.
Yahoo! Inc. (Dec. 7, 2005). "Yahoo! Widget Engine 3.0 Reference Manual Version 3.0," 300 pages.
U.S. Appl. No. 12/407,690, filed Mar. 19, 2009; 50 pages.
U.S. Appl. No. 12/407,681, filed Mar. 19, 2009; 56 pages.
International Search Report PCT/US2008/088228 dated Sep. 30, 2009—2 pages.
Written Opinion PCT/US2008/088228 dated Sep. 30, 2009—5 pages.
U.S. Appl. No. 11/617,451, filed Dec. 28, 2006, Kalaboukis.
U.S. Appl. No. 11/562,973, filed Nov. 22, 2006, Martinez.
U.S. Appl. No. 11/562,974, filed Nov. 22, 2006, Martinez.
U.S. Appl. No. 11/562,976, filed Nov. 22, 2006, Martinez.
U.S. Appl. No. 11/562,979, filed Nov. 22, 2006, Martinez.
U.S. Appl. No. 12/237,709, filed Sep. 25, 2008, Martinez.
U.S. Appl. No. 12/399,669, filed Mar. 6, 2009, King.
U.S. Appl. No. 11/353,657, filed Feb. 13, 2006, Mor Naaman.
U.S. Appl. No. 11/437,344, filed May 19, 2006, Jaffe.
U.S. Appl. No. 11/593,869, filed Nov. 6, 2006, Mor Naaman.
U.S. Appl. No. 11/593,668, filed Nov. 6, 2006, Mor Naaman.
Allen James F., "Maintaining Knowledge About Temporal Intervals", Communications of the ACM, Nov. 1983, vol. 26, No. 11 pp. 832-843; 12 pages.
Press Release, "Qualcomm Conducts First Live Demonstration of FL Technology on a Wireless Handset", Qualcomm Inc., San Diego, Sep. 27, 2005; 3 pages.
MediaFlo, FLO Technology Overview, Qualcomm Inc. Copyright 2007; 24 pages.
Axup, Jeff et al., "Conceptualizing New Mobile Devices by Observing Gossip and Social Network Formation Amongst the Extremely Mobile", ITEE Technical Report #459, Dec. 19, 2005, pp. 1-71.

(56) References Cited

OTHER PUBLICATIONS

Conhaim, Wallys W., "Social networks: the Internet continues to evolve: where is the money in all this? That is what venture capitalists are asking. (Perspectives)", Information Today, 22, 9, 35(2), Oct. 2005, (pp. 1-5 of attached).
Davis, Marc et al., "From Context to Content: Leveraging Context to Infer Media Metadata", ACM Press, Oct. 10, 2004, pp. 1-8.
Kaasinen, E., "Behaviour & Information Technology", Taylor & Francis, vol. 24, No. 1, Jan./Feb. 2005, pp. 37-49, (Abstract only attached).
Konomi, Shin'ichi et al., "Supporting Colocated Interactions Using RFID and Social Network Displays", Pervasive Computing, Jul.-Sep. 2006, vol. 5, No. 3, pp. 48-56 (pp. 1-4 of attached).
Lin, F. et al., "A unified framework for managing Web-based services.", Information Systems and e-Business Management, vol. 3, Oct. 2005, p. 299, (pp. 1-15 of attached).
Metz, Cade, "MySpace Nation", PC Magazine, Jun. 21, 2006, pp. 1-10 attached.
Perkowitz, Mike et al., "Utilizing Online Communities to Facilitate Physical World Interactions", The International Conference on Communities and Technologies, Sep. 19, 2003, Amsterdam, pp. 1 6.
Roush, Wade, "Social Machines", Continuous Computing Blog, Jul. 5, 2005, pp. 1-21.
Roush, Wade, "Social Machines", Technology Review, Aug. 2005, pp. 45-51.
Sheppard, Brett, "The Rights Stuff: The Integration of Enterprise Digital Rights Management Into an Enterprise Architecture", ECantent, vol. 29, No. 9, Nov. 2006, p. 38, 40-44, (pp. 1-7 of attached).
Voight, Joan et al., "Lessons for Today's Digital Market", ADWEEKCOM, Oct. 2, 2006, pp. 1-6.
"Companies add new communication features to photo sharing.", Digital Imaging Digest, Feb. 2006, pp. 1-2.
"Dave.TV and Eye Music Network Empower Users to Create Their Own Music TV Channel on Their Sites With New IPTV Channel", www.davenw.com/2006, Sep. 13, 2006, pp. 1-2.
"Digital rights management: a primer: developing a user-friendly means of protecting content.(Profile)", Screen Digest, Number: 420, p. 305, Sep. 2006, (pp. 1-9 of attached).
"Emerging Markets: What media 2.0 can offer advertisers.", Campaign, Oct. 27, 2006, p. 26, (pp. 1-5 of attached).
"Reality Digital Debuts Opus", www.lightreading.com. Sep. 25, 2006, pp. 1.
"Reality Digital—Making Media Move", www.realitydigital.com, Nov. 28, 2006, pp. 1-2.
Notification of Transmittal of the International Search Report and the Written Opinion of the International Search Authority, or Declaration (PCT/US2007/'084797) dated Mar. 21, 2008; 11 pages.
International Search Report (PCT/US2007/084807) dated May 27, 2008; 3 pages.
International Preliminary Report on Patentability (PCT/US2007/084807) dated May 26, 2009; 5 pages.
International Search Report (PCT/US2010/026063) dated May 27, 2008; 3 pages.
Rekimoto, et al., "CyberCode: designing augmented reality environments with visual tags." Proceedings of DARE 2000 on Designing augmented reality environments, Elsinore, Denmark, pp. 1-11 Apr. 12-14, 2000.
"Semacode-URL Barcodes-practical ubiquitous computing", located at http://semacode.org visited on Apr. 13, 2007; pp. 3.
"Technical White Paper; Choosing the best 2D barcode format for mobile apps," Semacode, Jul. 15, 2006; pp. 1-7 located at http://semacode.org/about/technical/whitepaper/best2_d_code.pdf.
Carbonell, J. et al. (Aug. 24-28, 1998). "The Use of MMR, Diversity-Based Reranking for Reordering Documents and Producing Summaries," SIGIR '98: Proceedings of the 21 S Annual International ACM SIGIR Conference on Research and Development in Information Retrieval: Melbourne, Australia W.B. Croft et al. eds., pp. 335-336.

Cooper, M. et al. (Nov. 2-8, 2003). "Temporal Event Clustering for Digital Photo Collections," MM'03 Berkeley, California, pp. 364-373.
Davis, M. et al. (Oct. 10-16, 2004). "From Context to Content: Leveraging Context to Infer Media Metadata," MM'04 New York, New York. 9 pages.
Davis, M. et al. "From Context to Content: Leveraging Context for Mobile Media Metadata." 9 pages.
Davis. M. et al. (Apr. 2-7, 2005). "MMM2: Mobile Media Metadata for Media Sharing," CHI 2005 Portland, Oregon. 4 pages.
Davis, M. et al. "Mobile Media Metadata for Mobile Imaging." Jun. 27-30, 2004; 4 pages.
Davis, M. et al. "Using Context and Similarity for Face and Location Identification." 10 pages.
Flickr. Welcome to Flickr—Photo Sharing, located at <http://www.flickr.com > visited on Feb. 26, 2007, one page.
Gargi, U. (Aug. 7, 2003). "Consumer Media Capture: Time-Based Analysis and Event Clustering," Technical Report HPL-2003-165 HP Laboratories Palo Alto, pp. 1-15.
Goldberger, J. et al. The Hungarian Clustering Method, located at <http://scholar.googles.com/scholar?num=20&h1=en&lr=&9=cache:vbwslsm1CisJ:www.openu .acil/Personal_sites/tarnirtassa/Publications/hcm.pdf+goldberger+clustering+method+hungarian> visited on Mar. 1, 2007, twelve pages.
Graham, A. et al. (Jul. 13-17, 2002). Time as Essence for Photo Browsing Through Personal Digital Libraries, JCDL '02 Portland, Oregon. 11 pages.
Jaffe, A. et al. (May 23-26, 2006). "Generating Summaries for Large Collections of Geo-Referenced Photographs," WWW 2006 Edinburgh, Scotland. 2 pages.
Jaffe, A. et al. (Oct. 26-27, 2006). "Generating Summaries and Visualization for Large Collections of Geo-Referenced Photographs," MIR '06 Santa Barbara, California. 11 pages.
Joshi, D. et al. (Oct. 15-16, 2004). "The Story Picturing Engine: Finding Elite Images to Illustrate a Story Using Miitual Reinforcement," MIR '04 New York, New York. 9 pages.
Naaman, M. et al. (Nov. 2003). "From Where to What: Metadata Sharing for Digital Photographs with Geographic Coordinates," In on the Movie to Meaningful Internet Systems 2003: Coop/S, DOA, and ODBASE R. Meersman et al. eds., pp. 196-217.
Naaman, M. et al. (Jun. 7-11, 2004). "Automatic Organization for Digital Photographs with Geographic Coordinates" Proceedings of the Fourth ACM/IEEE Joint Conference on Digital Libraries Global Reach and Diverse Impact: Tucson, Arizone, pp. 53-62.
Nair, R. et al. (Nov. 6-11, 2005). "Photo L01: Browsing Multi-User Photo Collections," MM'05 Singapore, pp. 223-224.
0'Hare, N. et al. "Combination of Content Analysis and Context Features for Digital Photograph Retrieval." 7 pages.
Pigeau, A. et al. (Jun. 17, 2005). "Organizing a Personal Image Collection with Statistical Model-Based ICL Clustering on Spatio-Temporal Camera Phone Meta-Data." 25 pages.
Sarvas, R. et al. (Jun. 6-9, 2004). "Metadata Creation System for Mobile Images," MobiSys'04 Boiton, Massachusetts, pp. 36-48.
Toyama, K. et al. (Nov. 2-8, 2003). "Geographic Location Tags on Digital Images," MM '03'Berkeley: California. 12 pages.
Nedos, A; Singh K., Clarke S, "Proximity Based Group Communications for Mobile Ad Hoc Networks", Proximity-Based Group Communication; Global Smart Spaces; D.14; Oct. 3, 2003; 31 pages.
Brunato, M; Battiti R. "Pilgrim: A Location Broker and Mobility-Aware Recommendation System"; Technical report DIT-02-0092, Universita di Trento, Oct. 2002; 8 pages.
Backstrom et al., Spatial Variation in Search Engine Queries, WWW•2008, Beijing, China (Apr. 21-25, 2008).
Gan et al., Analysis of Geographic Queries in a Search Engine Log, LocWeb 2008, Beijing, China (Apr. 22, 2008).
Jones et al., Geographic Intention and Modification in Web Search, International Journal of Geographical Information Science, vol. 22, No. 3, pp. 1-20 (Jul. 2008).
Sanderson et al., Analyzing Geographic Queries; Department of Information Studies; University of Sheffield, UK; 2 pages.

(56) References Cited

OTHER PUBLICATIONS

Go With the Flow, The Economist Technology Quarterly, vol. 382, Issue 8519, 4 pages, (Mar. 10, 2007).
International Search Report and Written Opinion (PCT/US2009/060476) dated May 4, 2010; 12 pages.
International Search Report and Written Opinion (PCT/US2009/060374) dated Apr. 30, 2010; 12 pages.
International Search Report (PCT/US2009/060379) dated Apr. 30, 2010; 3 pages.
International Search Report and Written Opinion (PCT/US2008/085135) dated May 25, 2009; 7 pages.
International Search Report (PCT/US2009/055503) dated Apr. 8, 2010; 3 pages.
Written Opinion (PCT/US2008/085915) dated Jun. 29, 2009; 4 pages.
Written Opinion (PCT/US2008/086948) dated May 21, 2009; 5 pages.
International Search Report and Written Opinion (PCT/US2009/051247) dated Jan. 25, 2010; 9 pages.
International Search Report and Written Opinion (PCT/US2009/046258) dated Dec. 23, 2009; 7 pages.

\* cited by examiner

SYSTEM AND METHOD FOR REPORTING AND ANALYSIS OF MEDIA CONSUMPTION DATA

This application includes material which is subject to copyright protection. The copyright owner has no objection to the facsimile reproduction by anyone of the patent disclosure, as it appears in the Patent and Trademark Office files or records, but otherwise reserves all copyright rights whatsoever.

FIELD OF THE INVENTION

The present invention relates to systems and methods for distributing media on a to users on a network and, more particularly, to systems and methods for distributing media on a to users on a network related to locations the users have visited.

BACKGROUND OF THE INVENTION

A great deal of information is generated when people use electronic devices, such as when people use mobile phones and cable set-top boxes. Such information, such as location, applications used, social network, physical and online locations visited, to name a few, could be used to deliver useful services and information to end users, and provide commercial opportunities to advertisers and retailers. However, most of this information is effectively abandoned due to deficiencies in the way such information can be captured. For example, and with respect to a mobile phone, information is generally not gathered while the mobile phone is idle (i.e., not being used by a user). Other information, such as presence of others in the immediate vicinity, time and frequency of messages to other users, and activities of a user's social network are also not captured effectively.

SUMMARY OF THE INVENTION

In one embodiment, the invention is a method and computer-readable medium having computer-executable instructions for a method. A request is received over a network from a requesting user for consumption data relating to at least one media object, the request comprising an identification of the media objects. Spatial, temporal, topical, and social data available to the network relating to consumption of the media object are retrieved using a global index of data available to the network. The spatial, temporal, topical, and social data available to the network relating to consumption of the media objects are transmitted, over the network to the requesting user.

In another embodiment, the invention is a system comprising: a request receiving module that receives, over a network, requests from requesting users for consumption data relating to media objects, wherein each request comprises an identification of the media objects; a media consumption data retrieval module that retrieves, for each request, spatial, temporal, topical, and social data available to the network relating to consumption of the media objects using a global index of data available to the network; a media consumption data filtration module that filters, for each request that further comprises at least one filtration criteria, the spatial, temporal, topical, and social data relating to consumption of the at least one media object using the \ filtration criteria; a media consumption data analysis module that analyzes, for each request that further comprise at least one data analysis criteria, the spatial, temporal, topical, and social data relating to consumption of the objects using the data analysis criteria; and a media consumption data transmission module that transmits, over the network, for each request, the filtered and analyzed relating to consumption of the media objects to the requesting user.

BRIEF DESCRIPTION OF THE DRAWINGS

The foregoing and other objects, features, and advantages of the invention will be apparent from the following more particular description of preferred embodiments as illustrated in the accompanying drawings, in which reference characters refer to the same parts throughout the various views. The drawings are not necessarily to scale, emphasis instead being placed upon illustrating principles of the invention.

DETAILED DESCRIPTION

Figure 1:
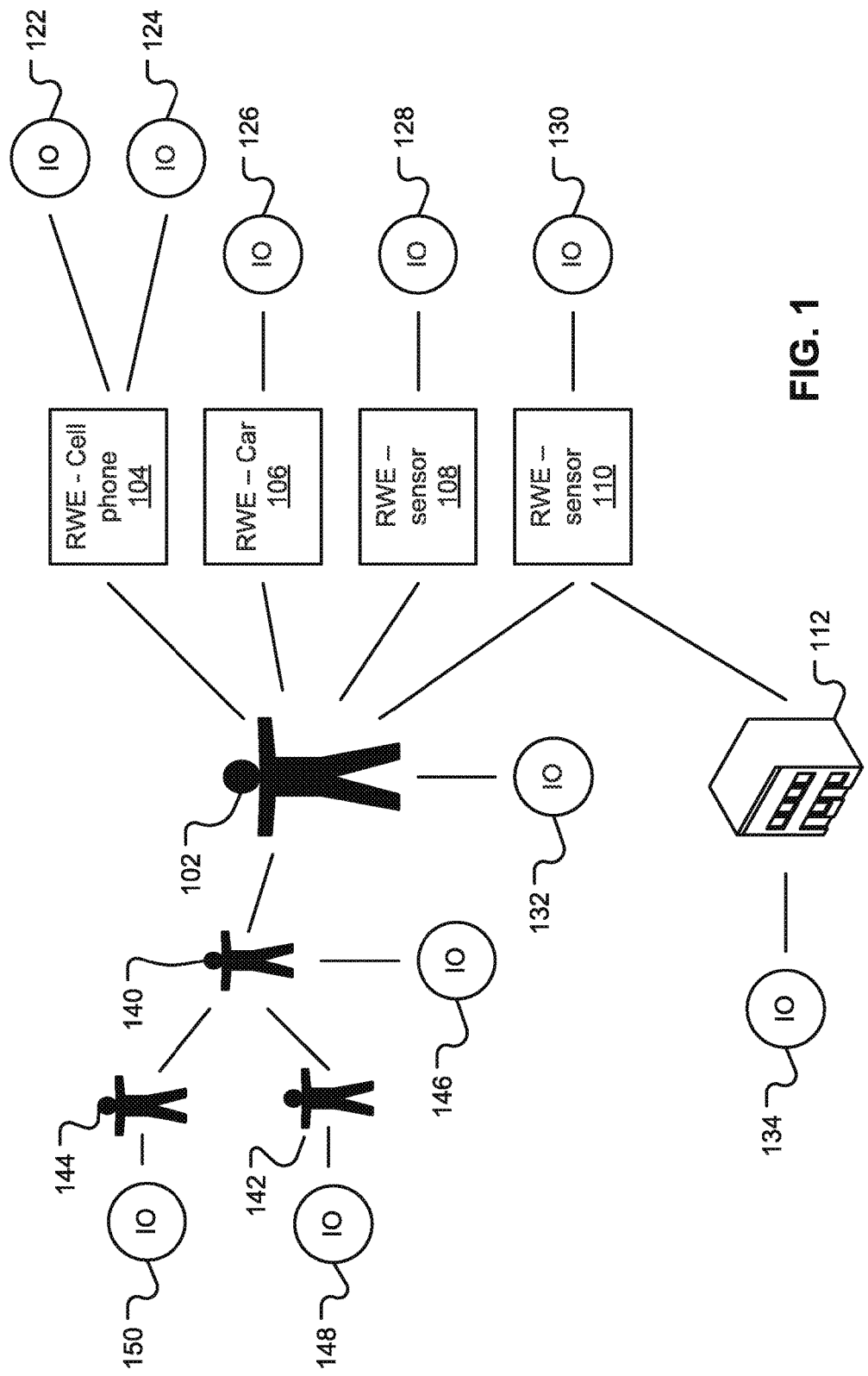
FIG. 1 illustrates relationships between real-world entities (RWE) and information objects (IO) on one embodiment of a W4 Communications Network (W4 COMN.)

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions.

These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and applications software which support the services provided by the server.

For the purposes of this disclosure the term "end user" or "user" should be understood to refer to a consumer of data supplied by a data provider. By way of example, and not limitation, the term "end user" can refer to a person who receives data provided by the data provider over the Internet in a browser session, or can refer to an automated software application which receives the data and stores or processes the data.

For the purposes of this disclosure the term "media" and "media content" should be understood to refer to binary data which contains content which can be of interest to an end user. By way of example, and not limitation, the term "media" and "media content" can refer to multimedia data, such as video data or audio data, or any other form of data capable of being transformed into a form perceivable by an end user. Such data can, furthermore, be encoded in any manner currently known, or which can be developed in the future, for specific purposes. By way of example, and not limitation, the data can be encrypted, compressed, and/or can contained embedded metadata.

For the purposes of this disclosure, a computer readable medium is a medium that stores computer data in machine readable form. By way of example, and not limitation, a computer readable medium can comprise computer storage media as well as communication media, methods or signals. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology; CD-ROM, DVD, or other optical storage; cassettes, tape, disk, or other magnetic storage devices; or any other medium which can be used to tangibly store the desired information and which can be accessed by the computer.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may grouped into an engine or an application.

For the purposes of this disclosure an engine is a software, hardware, or firmware (or combinations thereof) system, process or functionality that performs or facilitates the processes, features, and/or functions described herein (with or without human interaction or augmentation).

Embodiments of the present invention utilize information provided by a network which is capable of providing data collected and stored by multiple devices on a network. Such information may include, without limitation, temporal information, spatial information, and user information relating to a specific user or hardware device. User information may include, without limitation, user demographics, user preferences, user social networks, and user behavior. One embodiment of such a network is a W4 Communications Network.

A "W4 Communications Network" or W4 COMN, provides information related to the "Who, What, When and Where" of interactions within the network. In one embodiment, the W4 COMN is a collection of users, devices and processes that foster both synchronous and asynchronous communications between users and their proxies providing an instrumented network of sensors providing data recognition and collection in real-world environments about any subject, location, user or combination thereof.

In one embodiment, the W4 COMN can handle the routing/addressing, scheduling, filtering, prioritization, replying, forwarding, storing, deleting, privacy, transacting, triggering of a new message, propagating changes, transcoding and linking. Furthermore, these actions can be performed on any communication channel accessible by the W4 COMN.

In one embodiment, the W4 COMN uses a data modeling strategy for creating profiles for not only users and locations, but also any device on the network and any kind of user-defined data with user-specified conditions. Using Social, Spatial, Temporal and Logical data available about a specific user, topic or logical data object, every entity known to the W4 COMN can be mapped and represented against all other known entities and data objects in order to create both a micro graph for every entity as well as a global graph that relates all known entities with one another. In one embodiment, such relationships between entities and data objects are stored in a global index within the W4 COMN.

In one embodiment, a W4 COMN network relates to what may be termed "real-world entities", hereinafter referred to as RWEs. A RWE refers to, without limitation, a person, device, location, or other physical thing known to a W4 COMN. In one embodiment, each RWE known to a W4 COMN is assigned a unique W4 identification number that identifies the RWE within the W4 COMN.

RWEs can interact with the network directly or through proxies, which can themselves be RWEs. Examples of RWEs that interact directly with the W4 COMN include any device such as a sensor, motor, or other piece of hardware connected to the W4 COMN in order to receive or transmit data or control signals. RWE may include all devices that can serve as network nodes or generate, request and/or consume data in a networked environment or that can be controlled through a network. Such devices include any kind of "dumb" device purpose-designed to interact with a network (e.g., cell phones, cable television set top boxes, fax machines, telephones, and radio frequency identification (RFID) tags, sensors, etc.).

Examples of RWEs that may use proxies to interact with W4 COMN network include non-electronic entities including physical entities, such as people, locations (e.g., states, cities, houses, buildings, airports, roads, etc.) and things (e.g., animals, pets, livestock, gardens, physical objects, cars, airplanes, works of art, etc.), and intangible entities such as business entities, legal entities, groups of people or sports teams. In addition, "smart" devices (e.g., computing devices such as smart phones, smart set top boxes, smart cars that support communication with other devices or networks, laptop computers, personal computers, server computers, satellites, etc.) may be considered RWE that use proxies to interact with the network, where software applications executing on the device that serve as the devices' proxies.

In one embodiment, a W4 COMN may allow associations between RWEs to be determined and tracked. For example, a given user (an RWE) can be associated with any number and type of other RWEs including other people, cell phones, smart credit cards, personal data assistants, email and other communication service accounts, networked computers, smart appliances, set top boxes and receivers for cable television and other media services, and any other networked device. This association can be made explicitly by the user, such as when the RWE is installed into the W4 COMN.

An example of this is the set up of a new cell phone, cable television service or email account in which a user explicitly identifies an RWE (e.g., the user's phone for the cell phone service, the user's set top box and/or a location for cable service, or a username and password for the online service) as being directly associated with the user. This explicit association can include the user identifying a specific relationship between the user and the RWE (e.g., this is my device, this is my home appliance, this person is my friend/father/son/etc., this device is shared between me and other users, etc.). RWEs can also be implicitly associated with a user based on a current situation. For example, a weather sensor on the W4 COMN can be implicitly associated with a user based on information indicating that the user lives or is passing near the sensor's location.

In one embodiment, a W4 COMN network may additionally include what may be termed "information-objects", hereinafter referred to as IOs. An information object (IO) is a logical object that may store, maintain, generate or otherwise provides data for use by RWEs and/or the W4 COMN. In one embodiment, data within in an IO can be revised by the act of an RWE An IO within in a W4 COMN can be provided a unique W4 identification number that identifies the IO within the W4 COMN.

In one embodiment, IOs include passive objects such as communication signals (e.g., digital and analog telephone signals, streaming media and interprocess communications), email messages, transaction records, virtual cards, event records (e.g., a data file identifying a time, possibly in combination with one or more RWEs such as users and locations, that can further be associated with a known topic/activity/significance such as a concert, rally, meeting, sporting event, etc.), recordings of phone calls, calendar entries, web pages, database entries, electronic media objects (e.g., media files containing songs, videos, pictures, images, audio messages, phone calls, etc.), electronic files and associated metadata.

In one embodiment, IOs include any executing process or application that consumes or generates data such as an email communication application (such as OUTLOOK by MICROSOFT, or YAHOO! MAIL by YAHOO!), a calendaring application, a word processing application, an image editing application, a media player application, a weather monitoring application, a browser application and a web page server application. Such active IOs can or can not serve as a proxy for one or more RWEs. For example, voice communication software on a smart phone can serve as the proxy for both the smart phone and for the owner of the smart phone.

In one embodiment, for every IO there are at least three classes of associated RWEs. The first is the RWE that owns or controls the IO, whether as the creator or a rights holder (e.g., an RWE with editing rights or use rights to the IO). The second is the RWE(s) that the IO relates to, for example by containing information about the RWE or that identifies the RWE. The third are any RWEs that access the IO in order to obtain data from the IO for some purpose.

Within the context of a W4 COMN, "available data" and "W4 data" means data that exists in an IO or data that can be collected from a known IO or RWE such as a deployed sensor. Within the context of a W4 COMN, "sensor" means any source of W4 data including PCs, phones, portable PCs or other wireless devices, household devices, cars, appliances, security scanners, video surveillance, RFID tags in clothes, products and locations, online data or any other source of information about a real-world user/topic/thing (RWE) or logic-based agent/process/topic/thing (IO).

FIG. 1 illustrates one embodiment of relationships between RWEs and IOs on a W4 COMN. A user 102 is a RWE provided with a unique network ID. The user 102 may be a human that communicates with the network using proxy devices 104, 106, 108, 110 associated with the user 102, all of which are RWEs having a unique network ID. These proxies can communicate directly with the W4 COMN or can communicate with the W4 COMN using IOs such as applications executed on or by a proxy device.

In one embodiment, the proxy devices 104, 106, 108, 110 can be explicitly associated with the user 102. For example, one device 104 can be a smart phone connected by a cellular service provider to the network and another device 106 can be a smart vehicle that is connected to the network. Other devices can be implicitly associated with the user 102.

For example, one device 108 can be a "dumb" weather sensor at a location matching the current location of the user's cell phone 104, and thus implicitly associated with the user 102 while the two RWEs 104, 108 are co-located. Another implicitly associated device 110 can be a sensor 110 for physical location 112 known to the W4 COMN. The location 112 is known, either explicitly (through a user-designated relationship, e.g., this is my home, place of employment, parent, etc.) or implicitly (the user 102 is often co-located with the RWE 112 as evidenced by data from the sensor 110 at that location 112), to be associated with the first user 102.

The user 102 can be directly associated with one or more persons 140, and indirectly associated with still more persons 142, 144 through a chain of direct associations. Such associations can be explicit (e.g., the user 102 can have identified the associated person 140 as his/her father, or can have identified the person 140 as a member of the user's social network) or implicit (e.g., they share the same address). Tracking the associations between people (and other RWEs as well) allows the creation of the concept of "intimacy", where intimacy may be defined as a measure of the degree of association between two people or RWEs. For example, each degree of removal between RWEs can be considered a lower level of intimacy, and assigned lower intimacy score. Intimacy can be based solely on explicit social data or can be expanded to include all W4 data including spatial data and temporal data.

In one embodiment, each RWE 102, 104, 106, 108, 110, 112, 140, 142, 144 of a W4 COMN can be associated with one or more IOs as shown. FIG. 1 illustrates two IOs 122, 124 as associated with the cell phone device 104. One IO 122 can be a passive data object such as an event record that is used by scheduling/calendaring software on the cell phone, a contact IO used by an address book application, a historical record of a transaction made using the device 104 or a copy of a message sent from the device 104. The other IO 124 can be an active software process or application that serves as the device's proxy to the W4 COMN by transmitting or receiving data via the W4 COMN. Voice communication software, scheduling/calendaring software, an address book application or a text messaging application are all examples of IOs that can communicate with other IOs and RWEs on the network. IOs may additionally relate to topics of interest to one or more RWEs, such topics including, without limitation, musical artists, genre of music, a location and so forth.

The IOs 122, 124 can be locally stored on the device 104 or stored remotely on some node or datastore accessible to the W4 COMN, such as a message server or cell phone service datacenter. The IO 126 associated with the vehicle 108 can be an electronic file containing the specifications and/or current status of the vehicle 108, such as make, model, identification number, current location, current speed, current condition, current owner, etc. The IO 128 associated with sensor 108 can identify the current state of the subject(s) monitored by the sensor 108, such as current weather or current traffic. The IO 130 associated with the cell phone 110 can be information in a database identifying recent calls or the amount of charges on the current bill.

RWEs which can only interact with the W4 COMN through proxies, such as people 102, 140, 142, 144, computing devices 104, 106 and locations 112, can have one or more IOs 132, 134, 146, 148, 150 directly associated with them which contain RWE-specific information for the associated RWE. For example, IOs associated with a person 132, 146, 148, 150 can include a user profile containing email addresses, telephone numbers, physical addresses, user preferences, identification of devices and other RWEs associated with the user. The IOs may additionally include records of the user's past interactions with other RWEs on the W4 COMN (e.g., transaction records, copies of messages, listings of time and location combinations recording the user's whereabouts in the past), the unique W4 COMN identifier for the location and/or any relationship information (e.g., explicit user-designations of the user's relationships with relatives, employers, co-workers, neighbors, service providers, etc.).

Another example of IOs associated with a person 132, 146, 148, 150 includes remote applications through which a person can communicate with the W4 COMN such as an account with a web-based email service such as Yahoo! Mail. A location's IO 134 can contain information such as the exact coordinates of the location, driving directions to the location, a classification of the location (residence, place of business, public, non-public, etc.), information about the services or products that can be obtained at the location, the unique W4 COMN identifier for the location, businesses located at the location, photographs of the location, etc.

In one embodiment, RWEs and IOs are correlated to identify relationships between them. RWEs and IOs may be correlated using metadata. For example, if an IO is a music file, metadata for the file can include data identifying the artist, song, etc., album art, and the format of the music data. This metadata can be stored as part of the music file or in one or more different IOs that are associated with the music file or both. W4 metadata can additionally include the owner of the music file and the rights the owner has in the music file. As another example, if the IO is a picture taken by an electronic camera, the picture can include in addition to the primary image data from which an image can be created on a display, metadata identifying when the picture was taken, where the camera was when the picture was taken, what camera took the picture, who, if anyone, is associated (e.g., designated as the camera's owner) with the camera, and who and what are the subjects of/in the picture. The W4 COMN uses all the available metadata in order to identify implicit and explicit associations between entities and data objects.

Figure 2:
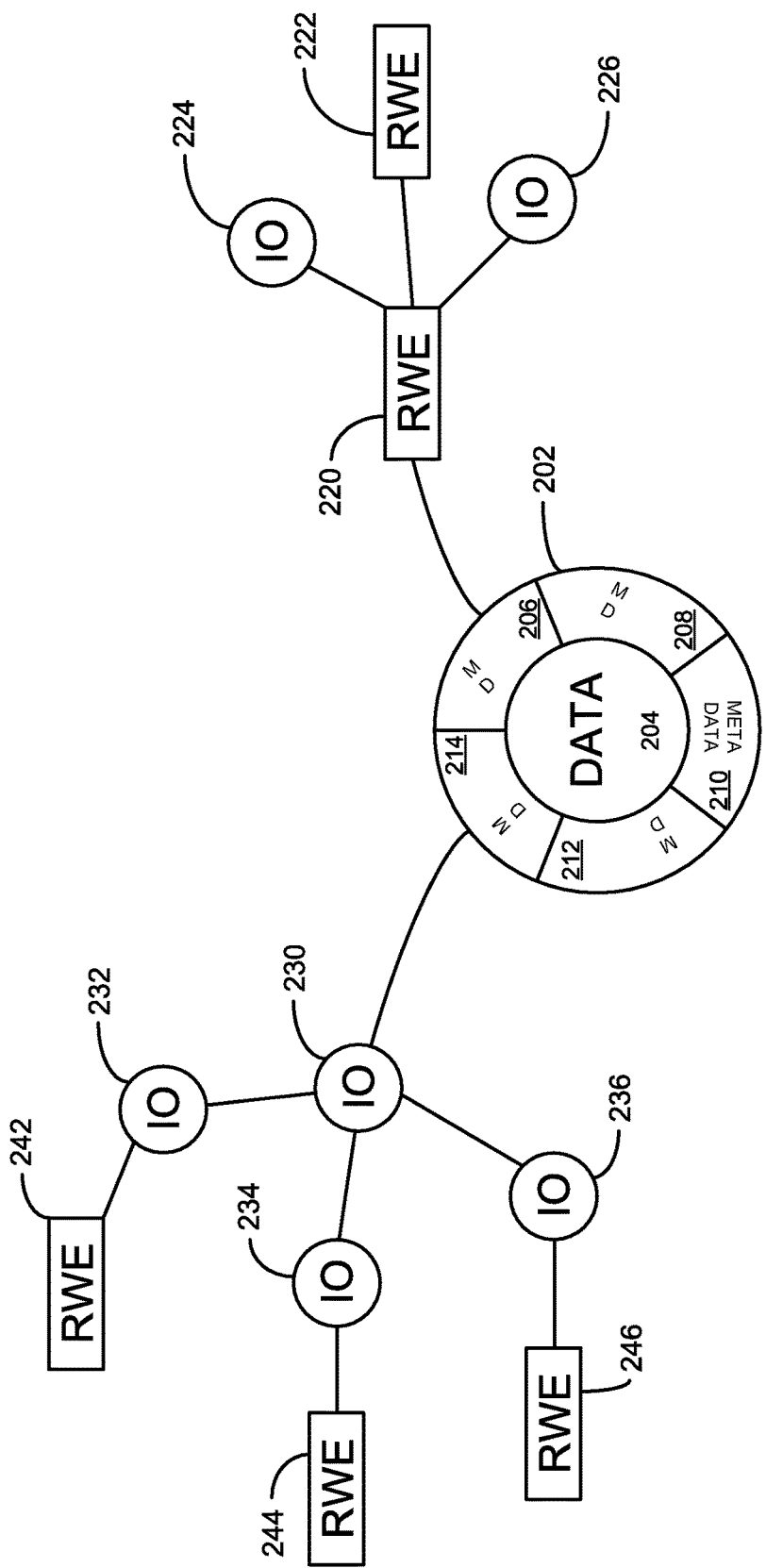
FIG. 2 illustrates metadata defining the relationships between RWEs and IOs on one embodiment of a W4 COMN.

FIG. 2 illustrates one embodiment of metadata defining the relationships between RWEs and IOs on the W4 COMN. In the embodiment shown, an IO 202 includes object data 204 and five discrete items of metadata 206, 208, 210, 212, 214. Some items of metadata 208, 210, 212 can contain information related only to the object data 204 and unrelated to any other IO or RWE. For example, a creation date, text or an image that is to be associated with the object data 204 of the IO 202.

Some of items of metadata 206, 214, on the other hand, can identify relationships between the IO 202 and other RWEs and IOs. As illustrated, the IO 202 is associated by one item of metadata 206 with an RWE 220 that RWE 220 is further associated with two IOs 224, 226 and a second RWE 222 based on some information known to the W4 COMN. For example, could describe the relations between an image (IO 202) containing metadata 206 that identifies the electronic camera (the first RWE 220) and the user (the second RWE 224) that is known by the system to be the owner of the camera 220. Such ownership information can be determined, for example, from one or another of the IOs 224, 226 associated with the camera 220.

FIG. 2 also illustrates metadata 214 that associates the IO 202 with another IO 230. This IO 230 is itself associated with three other IOs 232, 234, 236 that are further associated with different RWEs 242, 244, 246. This part of FIG. 2, for example, could describe the relations between a music file (IO 202) containing metadata 206 that identifies the digital rights file (the first IO 230) that defines the scope of the rights of use associated with this music file 202. The other IOs 232, 234, 236 are other music files that are associated with the rights of use and which are currently associated with specific owners (RWEs 242, 244, 246).

Figure 3:
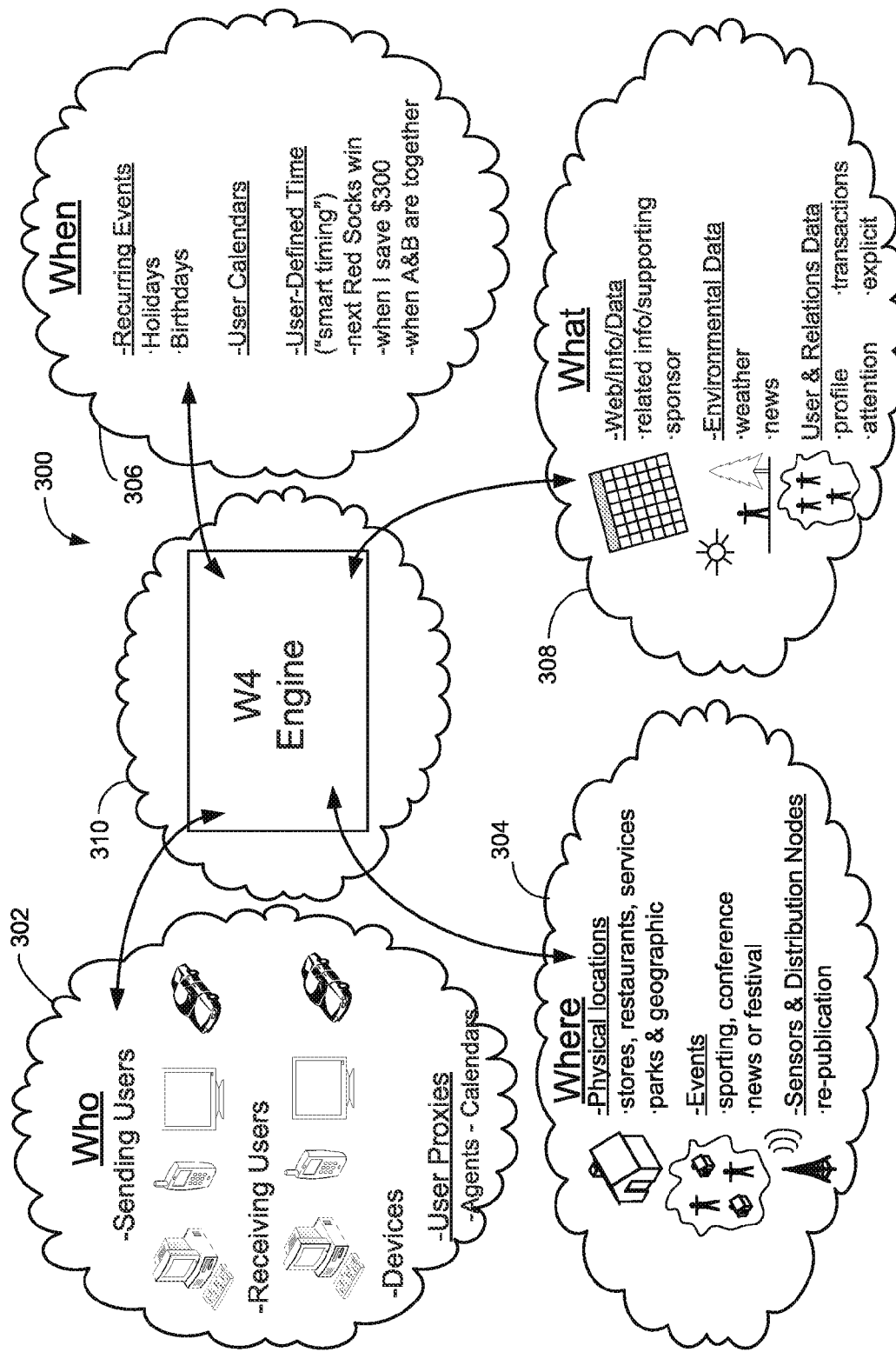
FIG. 3 illustrates a conceptual model of one embodiment of a W4 COMN.

FIG. 3 illustrates one embodiment of a conceptual model of a W4 COMN. The W4 COMN 300 creates an instrumented messaging infrastructure in the form of a global logical network cloud conceptually sub-divided into networked-clouds for each of the 4Ws: Who, Where, What and When. In the Who cloud 302 are all users whether acting as senders, receivers, data points or confirmation/certification sources as well as user proxies in the forms of user-program processes, devices, agents, calendars, etc.

In the Where cloud 304 are all physical locations, events, sensors or other RWEs associated with a spatial reference point or location. The When cloud 306 is composed of natural temporal events (that is events that are not associated with particular location or person such as days, times, seasons) as well as collective user temporal events (holidays, anniversaries, elections, etc.) and user-defined temporal events (birthdays, smart-timing programs).

The What cloud 308 is comprised of all known data—web or private, commercial or user—accessible to the W4 COMN, including for example environmental data like weather and news, RWE-generated data, IOs and IO data, user data, models, processes and applications. Thus, conceptually, most data is contained in the What cloud 308.

Some entities, sensors or data may potentially exist in multiple clouds either disparate in time or simultaneously. Additionally, some IOs and RWEs can be composites in that they combine elements from one or more clouds. Such composites can be classified as appropriate to facilitate the determination of associations between RWEs and IOs. For example, an event consisting of a location and time could be equally classified within the When cloud 306, the What cloud 308 and/or the Where cloud 304.

In one embodiment, a W4 engine 310 is center of the W4 COMN's intelligence for making all decisions in the W4 COMN. The W4 engine 310 controls all interactions between each layer of the W4 COMN and is responsible for executing any approved user or application objective enabled by W4 COMN operations or interoperating applications. In an embodiment, the W4 COMN is an open platform with standardized, published APIs for requesting (among other things) synchronization, disambiguation, user or topic addressing, access rights, prioritization or other value-based ranking, smart scheduling, automation and topical, social, spatial or temporal alerts.

One function of the W4 COMN is to collect data concerning all communications and interactions conducted via the W4 COMN, which can include storing copies of IOs and information identifying all RWEs and other information related to the IOs (e.g., who, what, when, where information). Other data collected by the W4 COMN can include information about the status of any given RWE and IO at any given time, such as the location, operational state, monitored conditions (e.g., for an RWE that is a weather sensor, the current weather conditions being monitored or for an RWE that is a cell phone, its current location based on the cellular towers it is in contact with) and current status.

The W4 engine 310 is also responsible for identifying RWEs and relationships between RWEs and IOs from the data and communication streams passing through the W4 COMN. The function of identifying RWEs associated with or implicated by IOs and actions performed by other RWEs may be referred to as entity extraction. Entity extraction can include both simple actions, such as identifying the sender and receivers of a particular IO, and more complicated analyses of the data collected by and/or available to the W4 COMN, for example determining that a message listed the time and location of an upcoming event and associating that event with the sender and receiver(s) of the message based on the context of the message or determining that an RWE is stuck in a traffic jam based on a correlation of the RWE's location with the status of a co-located traffic monitor.

It should be noted that when performing entity extraction from an IO, the IO can be an opaque object with only where only W4 metadata related to the object is visible, but internal data of the IO (i.e., the actual primary or object data contained within the object) are not, and thus metadata extraction is limited to the metadata. Alternatively, if internal data of the IO is visible, it can also be used in entity extraction, e.g. strings within an email are extracted and associated as RWEs to for use in determining the relationships between the sender, user, topic or other RWE or IO impacted by the object or process.

In the embodiment shown, the W4 engine 310 can be one or a group of distributed computing devices, such as a general-purpose personal computers (PCs) or purpose built server computers, connected to the W4 COMN by communication hardware and/or software. Such computing devices can be a single device or a group of devices acting together. Computing devices can be provided with any number of program modules and data files stored in a local or remote mass storage device and local memory (e.g., RAM) of the computing device. For example, as mentioned above, a computing device can include an operating system suitable for controlling the operation of a networked computer, such as the WINDOWS XP or WINDOWS SERVER operating systems from MICROSOFT CORPORATION.

Some RWEs can also be computing devices such as, without limitation, smart phones, web-enabled appliances, PCs, laptop computers, and personal data assistants (PDAs). Computing devices can be connected to one or more communications networks such as the Internet, a publicly switched telephone network, a cellular telephone network, a satellite communication network, a wired communication network such as a cable television or private area network. Computing devices can be connected any such network via a wired data connection or wireless connection such as a wi-fi, a WiMAX (802.36), a Bluetooth or a cellular telephone connection.

Local data structures, including discrete IOs, can be stored on a computer-readable medium (not shown) that is connected to, or part of, any of the computing devices described herein including the W4 engine 310. For example, in one embodiment, the data backbone of the W4 COMN, discussed below, includes multiple mass storage devices that maintain the IOs, metadata and data necessary to determine relationships between RWEs and IOs as described herein.

Figure 4:
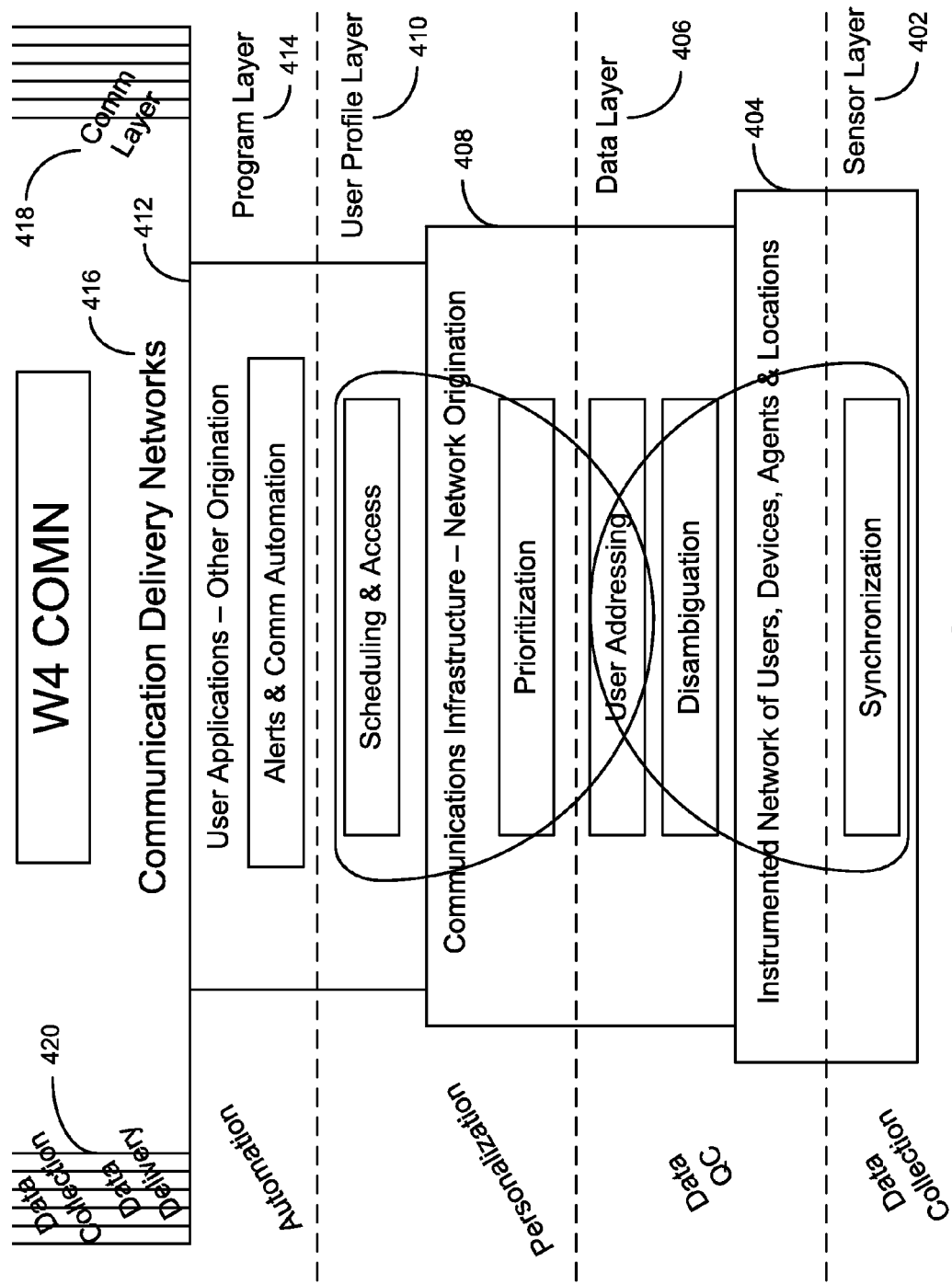
FIG. 4 illustrates the functional layers of one embodiment of the W4 COMN architecture.

FIG. 4 illustrates one embodiment of the functional layers of a W4 COMN architecture. At the lowest layer, referred to as the sensor layer 402, is the network 404 of the actual devices, users, nodes and other RWEs. Sensors include known technologies like web analytics, GPS, cell-tower pings, use logs, credit card transactions, online purchases, explicit user profiles and implicit user profiling achieved through behavioral targeting, search analysis and other analytics models used to optimize specific network applications or functions.

The data layer 406 stores and catalogs the data produced by the sensor layer 402. The data can be managed by either the network 404 of sensors or the network infrastructure 406 that is built on top of the instrumented network of users, devices, agents, locations, processes and sensors. The network infrastructure 408 is the core under-the-covers network infrastructure that includes the hardware and software necessary to receive that transmit data from the sensors, devices, etc. of the network 404. It further includes the processing and storage capability necessary to meaningfully categorize and track the data created by the network 404.

The user profiling layer 410 performs the W4 COMN's user profiling functions. This layer 410 can further be distributed between the network infrastructure 408 and user applications/processes 412 executing on the W4 engine or disparate user computing devices. Personalization is enabled across any single or combination of communication channels and modes including email, IM, texting (SMS, etc.), photo-blogging, audio (e.g. telephone call), video (teleconferencing, live broadcast), games, data confidence processes, security, certification or any other W4 COMM process call for available data.

In one embodiment, the user profiling layer 410 is a logic-based layer above all sensors to which sensor data are sent in the rawest form to be mapped and placed into the W4 COMN data backbone 420. The data (collected and refined, related and deduplicated, synchronized and disambiguated) are then stored in one or a collection of related databases available applications approved on the W4 COMN. Network-originating actions and communications are based upon the fields of the data backbone, and some of these actions are such that they themselves become records somewhere in the backbone, e.g. invoicing, while others, e.g. fraud detection, synchronization, disambiguation, can be done without an impact to profiles and models within the backbone.

Actions originating from outside the network, e.g., RWEs such as users, locations, proxies and processes, come from the applications layer 414 of the W4 COMN. Some applications can be developed by the W4 COMN operator and appear to be implemented as part of the communications infrastructure 408, e.g. email or calendar programs because of how closely they operate with the sensor processing and user profiling layer 410. The applications 412 also serve as a sensor in that they, through their actions, generate data back to the data layer 406 via the data backbone concerning any data created or available due to the applications execution.

In one embodiment, the applications layer 414 can also provide a user interface (UI) based on device, network, carrier as well as user-selected or security-based customizations. Any UI can operate within the W4 COMN if it is instrumented to provide data on user interactions or actions back to the network. In the case of W4 COMN enabled mobile devices, the UI can also be used to confirm or disambiguate incomplete W4 data in real-time, as well as correlation, triangulation and synchronization sensors for other nearby enabled or non-enabled devices.

At some point, the network effects enough enabled devices allow the network to gather complete or nearly complete data (sufficient for profiling and tracking) of a non-enabled device because of its regular intersection and sensing by enabled devices in its real-world location.

Above the applications layer 414, or hosted within it, is the communications delivery network 416. The communications delivery network can be operated by the W4 COMN operator or be independent third-party carrier service. Data may be delivered via synchronous or asynchronous communication. In every case, the communication delivery network 414 will be sending or receiving data on behalf of a specific application or network infrastructure 408 request.

The communication delivery layer 418 also has elements that act as sensors including W4 entity extraction from phone calls, emails, blogs, etc. as well as specific user commands within the delivery network context. For example, "save and prioritize this call" said before end of call can trigger a recording of the previous conversation to be saved and for the W4 entities within the conversation to be analyzed and increased in weighting prioritization decisions in the personalization/user profiling layer 410.

Figure 5:
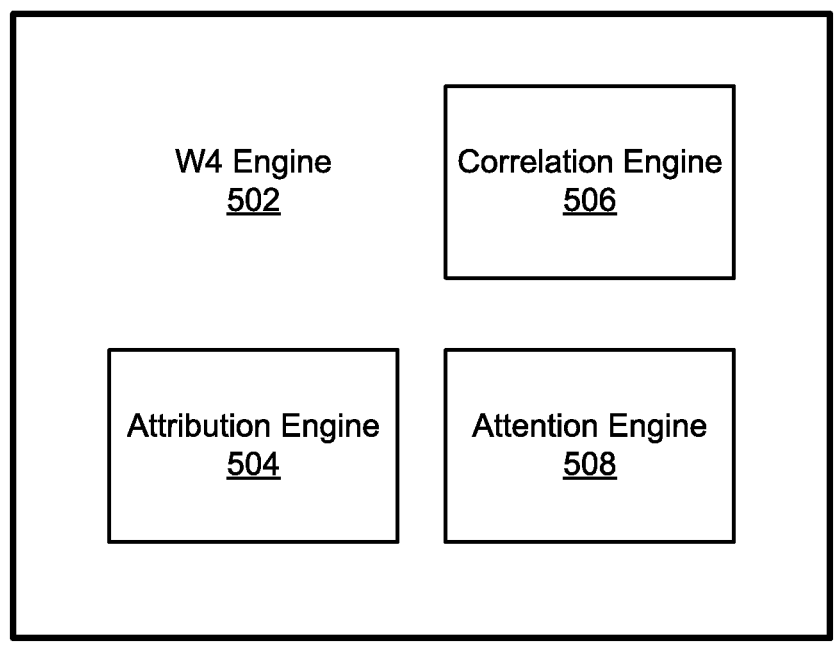
FIG. 5 illustrates the analysis components of one embodiment of a W4 engine as shown in FIG. 2.

FIG. 5 illustrates one embodiment of the analysis components of a W4 engine as shown in FIG. 3. As discussed above, the W4 Engine is responsible for identifying RWEs and relationships between RWEs and IOs from the data and communication streams passing through the W4 COMN.

In one embodiment the W4 engine connects, interoperates and instruments all network participants through a series of sub-engines that perform different operations in the entity extraction process. The attribution engine 504 tracks the real-world ownership, control, publishing or other conditional rights of any RWE in any IO. Whenever a new IO is detected by the W4 engine 502, e.g., through creation or transmission of a new message, a new transaction record, a new image file, etc., ownership is assigned to the IO. The attribution engine 504 creates this ownership information and further allows this information to be determined for each IO known to the W4 COMN.

The correlation engine 506 can operates two capacities: first, to identify associated RWEs and IOs and their relationships (such as by creating a combined graph of any combination of RWEs and IOs and their attributes, relationships and reputations within contexts or situations) and second, as a sensor analytics pre-processor for attention events from any internal or external source.

In one embodiment, the identification of associated RWEs and IOs function of the correlation engine 506 is done by graphing the available data, using, for example, one or more histograms A histogram is a mapping technique that counts the number of observations that fall into various disjoint categories (i.e. bins.). By selecting each IO, RWE, and other known parameters (e.g., times, dates, locations, etc.) as different bins and mapping the available data, relationships between RWEs, IOs and the other parameters can be identified. A histogram of all RWEs and IOs is created, from which correlations based on the graph can be made.

As a pre-processor, the correlation engine 506 monitors the information provided by RWEs in order to determine if any conditions are identified that can trigger an action on the part of the W4 engine 502. For example, if a delivery condition has been associated with a message, when the correlation engine 506 determines that the condition is met, it can transmit the appropriate trigger information to the W4 engine 502 that triggers delivery of the message.

The attention engine 508 instruments all appropriate network nodes, clouds, users, applications or any combination thereof and includes close interaction with both the correlation engine 506 and the attribution engine 504.

Figure 6:
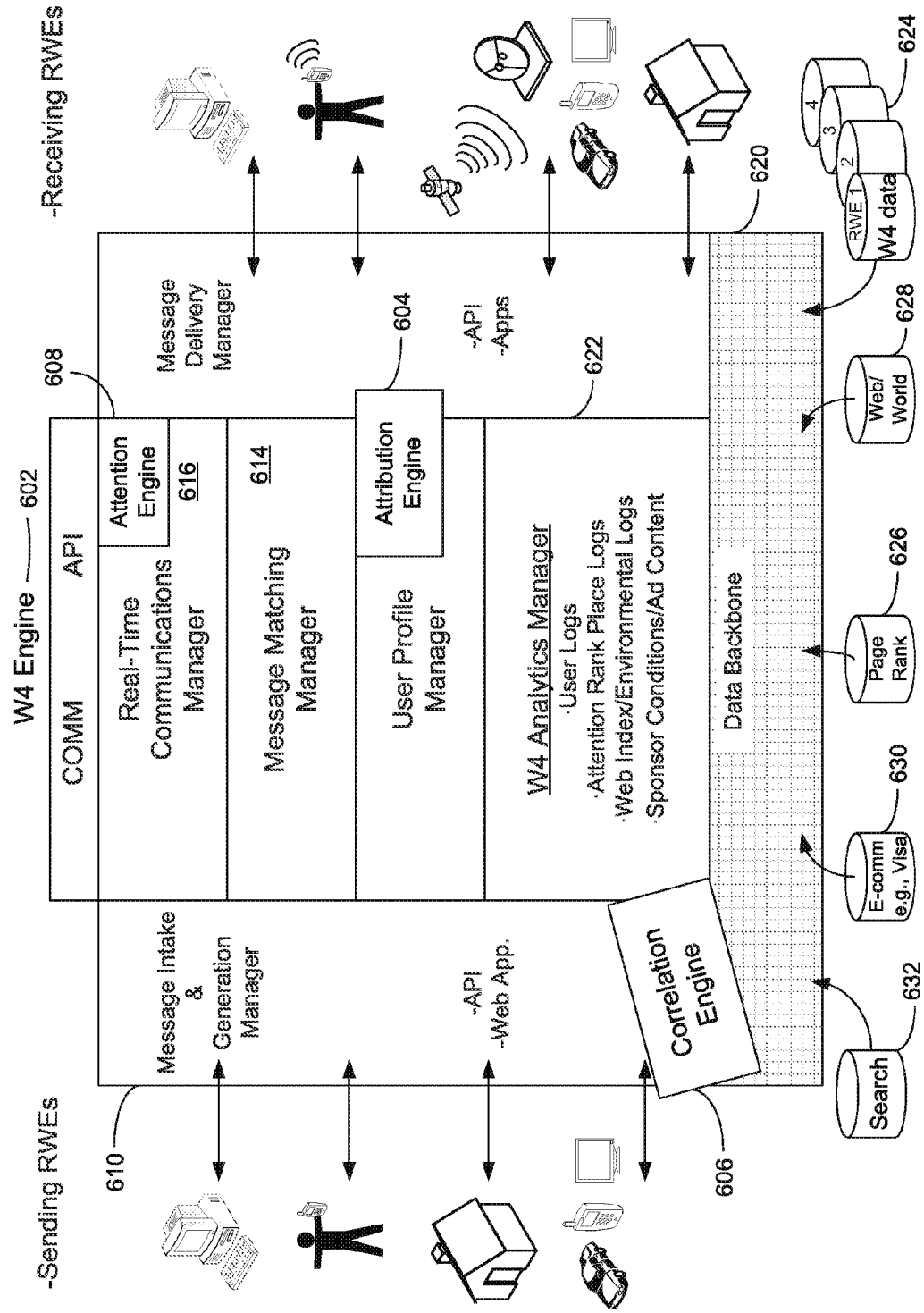
FIG. 6 illustrates one embodiment of a W4 engine showing different components.

FIG. 6 illustrates one embodiment of a W4 engine showing different components within the sub-engines described above with reference to FIG. 4. In one embodiment the W4 engine 602 includes an attention engine 608, attribution engine 604 and correlation engine 606 with several sub-managers based upon basic function.

The attention engine 608 includes a message intake and generation manager 610 as well as a message delivery manager 612 that work closely with both a message matching manager 614 and a real-time communications manager 616 to deliver and instrument all communications across the W4 COMN.

The attribution engine 604 works within the user profile manager 618 and in conjunction with all other modules to identify, process/verify and represent ownership and rights information related to RWEs, IOs and combinations thereof.

The correlation engine 606 dumps data from both of its channels (sensors and processes) into the same data backbone 620 which is organized and controlled by the W4 analytics manager 622. The data backbone 620 includes both aggregated and individualized archived versions of data from all network operations including user logs 624, attention rank place logs 626, web indices and environmental logs 618, e-commerce and financial transaction information 630, search indexes and logs 632, sponsor content or conditionals, ad copy and any and all other data used in any W4COMN process, IO or event. Because of the amount of data that the W4 COMN will potentially store, the data backbone 620 includes numerous database servers and datastores in communication with the W4 COMN to provide sufficient storage capacity.

The data collected by the W4 COMN includes spatial data, temporal data, RWE interaction data, IO content data (e.g., media data), and user data including explicitly-provided and deduced social and relationship data. Spatial data can be any data identifying a location associated with an RWE. For example, the spatial data can include any passively collected location data, such as cell tower data, global packet radio service (GPRS) data, global positioning service (GPS) data, WI-FI data, personal area network data, IP address data and data from other network access points, or actively collected location data, such as location data entered by the user.

Temporal data is time based data (e.g., time stamps) that relate to specific times and/or events associated with a user and/or the electronic device. For example, the temporal data can be passively collected time data (e.g., time data from a clock resident on the electronic device, or time data from a network clock), or the temporal data can be actively collected time data, such as time data entered by the user of the electronic device (e.g., a user maintained calendar).

Logical and IO data refers to the data contained by an IO as well as data associated with the IO such as creation time, owner, associated RWEs, when the IO was last accessed, the topic or subject of the IO (from message content or "re" or subject line, as some examples) etc. For example, an IO may relate to media data. Media data can include any data relating to presentable media, such as audio data, visual data, and audiovisual data. Audio data can be data relating to downloaded music, such as genre, artist, album and the like, and includes data regarding ringtones, ringbacks, media purchased, playlists, and media shared, to name a few. The visual data can be data relating to images and/or text received by the electronic device (e.g., via the Internet or other network). The visual data can be data relating to images and/or text sent from and/or captured at the electronic device.

Audiovisual data can be data associated with any videos captured at, downloaded to, or otherwise associated with the electronic device. The media data includes media presented to the user via a network, such as use of the Internet, and includes data relating to text entered and/or received by the user using the network (e.g., search terms), and interaction with the network media, such as click data (e.g., advertisement banner clicks, bookmarks, click patterns and the like). Thus, the media data can include data relating to the user's RSS feeds, subscriptions, group memberships, game services, alerts, and the like.

The media data can include non-network activity, such as image capture and/or video capture using an electronic device, such as a mobile phone. The image data can include metadata added by the user, or other data associated with the image, such as, with respect to photos, location when the photos were taken, direction of the shot, content of the shot, and time of day, to name a few. Media data can be used, for example, to deduce activities information or preferences information, such as cultural and/or buying preferences information.

Relationship data can include data relating to the relationships of an RWE or IO to another RWE or IO. For example, the relationship data can include user identity data, such as gender, age, race, name, social security number, photographs and other information associated with the user's identity. User identity information can also include e-mail addresses, login names and passwords. Relationship data can further include data identifying explicitly associated RWEs. For example, relationship data for a cell phone can indicate the user that owns the cell phone and the company that provides the service to the phone. As another example, relationship data for a smart car can identify the owner, a credit card associated with the owner for payment of electronic tolls, those users permitted to drive the car and the service station for the car.

Relationship data can also include social network data. Social network data includes data relating to any relationship that is explicitly defined by a user or other RWE, such as data relating to a user's friends, family, co-workers, business relations, and the like. Social network data can include, for example, data corresponding with a user-maintained electronic address book. Relationship data can be correlated with, for example, location data to deduce social network information, such as primary relationships (e.g., user-spouse, user-children and user-parent relationships) or other relationships (e.g., user-friends, user-co-worker, user-business associate relationships). Relationship data also can be utilized to deduce, for example, activities information.

Interaction data can be any data associated with user interaction of the electronic device, whether active or passive. Examples of interaction data include interpersonal communication data, media data, relationship data, transactional data and device interaction data, all of which are described in further detail below. Table 1, below, is a non-exhaustive list including examples of electronic data.

TABLE 1

Examples of Electronic Data

| Spatial Data | Temporal Data | Interaction Data |
| --- | --- | --- |
| Cell tower | Time stamps | Interpersonal |
| GPRS | Local clock | communications |
| GPS | Network clock | Media |
| WiFi | User input of time | Relationships |
| Personal area network | | Transactions |
| Network access points | | Device |
| User input of location | | interactions |
| Geo-coordinates | | |

Interaction data includes communication data between any RWEs that is transferred via the W4 COMN. For example, the communication data can be data associated with an incoming or outgoing short message service (SMS) message, email message, voice call (e.g., a cell phone call, a voice over IP call), or other type of interpersonal communication related to an RWE. Communication data can be correlated with, for example, temporal data to deduce information regarding frequency of communications, including concentrated communication patterns, which can indicate user activity information.

The interaction data can also include transactional data. The transactional data can be any data associated with commercial transactions undertaken by or at the mobile electronic device, such as vendor information, financial institution information (e.g., bank information), financial account information (e.g., credit card information), merchandise information and costs/prices information, and purchase frequency information, to name a few. The transactional data can be utilized, for example, to deduce activities and preferences information. The transactional information can also be used to deduce types of devices and/or services the user owns and/or in which the user can have an interest.

The interaction data can also include device or other RWE interaction data. Such data includes both data generated by interactions between a user and a RWE on the W4 COMN and interactions between the RWE and the W4 COMN. RWE interaction data can be any data relating to an RWE's interaction with the electronic device not included in any of the above categories, such as habitual patterns associated with use of an electronic device data of other modules/applications, such as data regarding which applications are used on an electronic device and how often and when those applications are used. As described in further detail below, device interaction data can be correlated with other data to deduce information regarding user activities and patterns associated therewith. Table 2, below, is a non-exhaustive list including examples of interaction data.

TABLE 2

Examples of Interaction Data

| Type of Data | Example(s) |
| --- | --- |
| Interpersonal communication data | Text-based communications, such as SMS and e-mail<br>Audio-based communications, such as voice calls, voice notes, voice mail<br>Media-based communications, such as multimedia messaging service (MMS) communications<br>Unique identifiers associated with a communication, such as phone numbers, e-mail addresses, and network addresses |
| Media data | Audio data, such as music data (artist, genre, track, album, etc.)<br>Visual data, such as any text, images and video data, including Internet data, picture data, podcast data and playlist data<br>Network interaction data, such as click patterns and channel viewing patterns |
| Relationship data | User identifying information, such as name, age, gender, race, and social security number<br>Social network data |
| Transactional data | Vendors<br>Financial accounts, such as credit cards and banks data<br>Type of merchandise/services purchased<br>Cost of purchases<br>Inventory of purchases |
| Device interaction data | Any data not captured above dealing with user interaction of the device, such as patterns of use of the device, applications utilized, and so forth |

Reporting and Analysis of Media Consumption Data

Providers of products and services, such as, for example, retailers and consumer products manufactures, typically track and analyze consumption data to better understand their customers and identify trends and consumption patterns. Such information helps providers of products and services fine-tune their product offerings to attract and retain the kind of customers that they are seeking and increase sales volume and profitability.

Providers of products and services generally track sales and shipment and understand where, when and how much of their products and services are sold. Such providers may accumulate additional demographic data regarding their customer base through, for example, frequent shopper programs or specially commissioned surveys. Additionally, consumption data for consumer products can be obtained from a wide variety of third party sources that obtain and analyze consumption data from multiple sources.

Providers of media, such as musical artists, producers, record labels have a corresponding interest in tracking sales of their products, obtaining customer demographics and tracking consumption patterns. Providers of media are typically aware of licensed sales of their products and of weekly billboard ratings (if applicable.) Depending on the distribution channels used, providers of media can also obtain demographics for their aggregated customers. Third party services, such as those provided by A. C. Nielsen and other ratings services can additionally provide more detailed data on consumer attitudes and opinions.

Such data on media consumption, however, does not fully capture the myriad ways in which media is used once it leaves the control of the provider. A provider of media may wish to know when, where, how and why a given media product is consumed. For example, a musical artist may wish to determine when a track was played (temporal data), where the track was played (geographic data), on what route was the user moving in a specific direction or in a particular way (spatial data), what was the user doing at the time (interest or activity data) or if the user was with their friends or co-workers (social data). The musical artist may wish to look at one axis of this data, or any combination of axis in order to determine where the "sweet spot(s)" of users consuming their music.

The musical artist can then use this data to tailor subsequent media that they will create. For example, the artist may believe that the music is most listened to during the morning commute, when in reality its listened to before listeners get in their car—or maybe only on weekends—or only at parties. In another example, if a producer determines that music for a "pub band" they manage is usually listened to alone, and not among friends, the producer could inform the band that their music is mostly listened to alone and the could band tweak their music so that the next track produced is more "party friendly."

Temporal, spatial and social data regarding media consumption can also be of use to advertisers. For example, suppose an advertiser wishes to promote a new breakfast drink designed to be consumed while commuting by car. The advertiser may wish to identify artists who are played during a morning commute. The advertiser can then approach those artists for a sponsorship deal. In another example, suppose a political candidate wishes to select a theme song for his or her campaign. The candidate may wish to select a song that is popular among individuals with specific political leanings, is listened to more frequently at a specific time of day, is listed to more frequently when the listener is moving or with friends, or is optimistic.

Temporal, spatial and social data regarding media consumption can additionally be of interest to individual listeners for non-commercial purposes such as browsing or exploring new music via the data associated with its consumption. For example, a listener may wish hear the most popular party track in San Francisco.

A W4 COMN can provide a platform that producers, artists and other interested users to obtain consumption data on media which can include spatial, topic detailed information on who is consuming media, where and when they are. The W4 COMN is able to achieve such a result, in part, because the W4 COMN is aware of the physical locations of persons and places, and is further aware of the media preferences of such persons and places and their relationship to one another. The W4 COMN also has access to aggregated users data profiles and behavior patterns over-time against which to map or compare new events in specific contexts to validate, modify or derive data values for consideration in the selection or presentation of media files to users.

Figure 7:
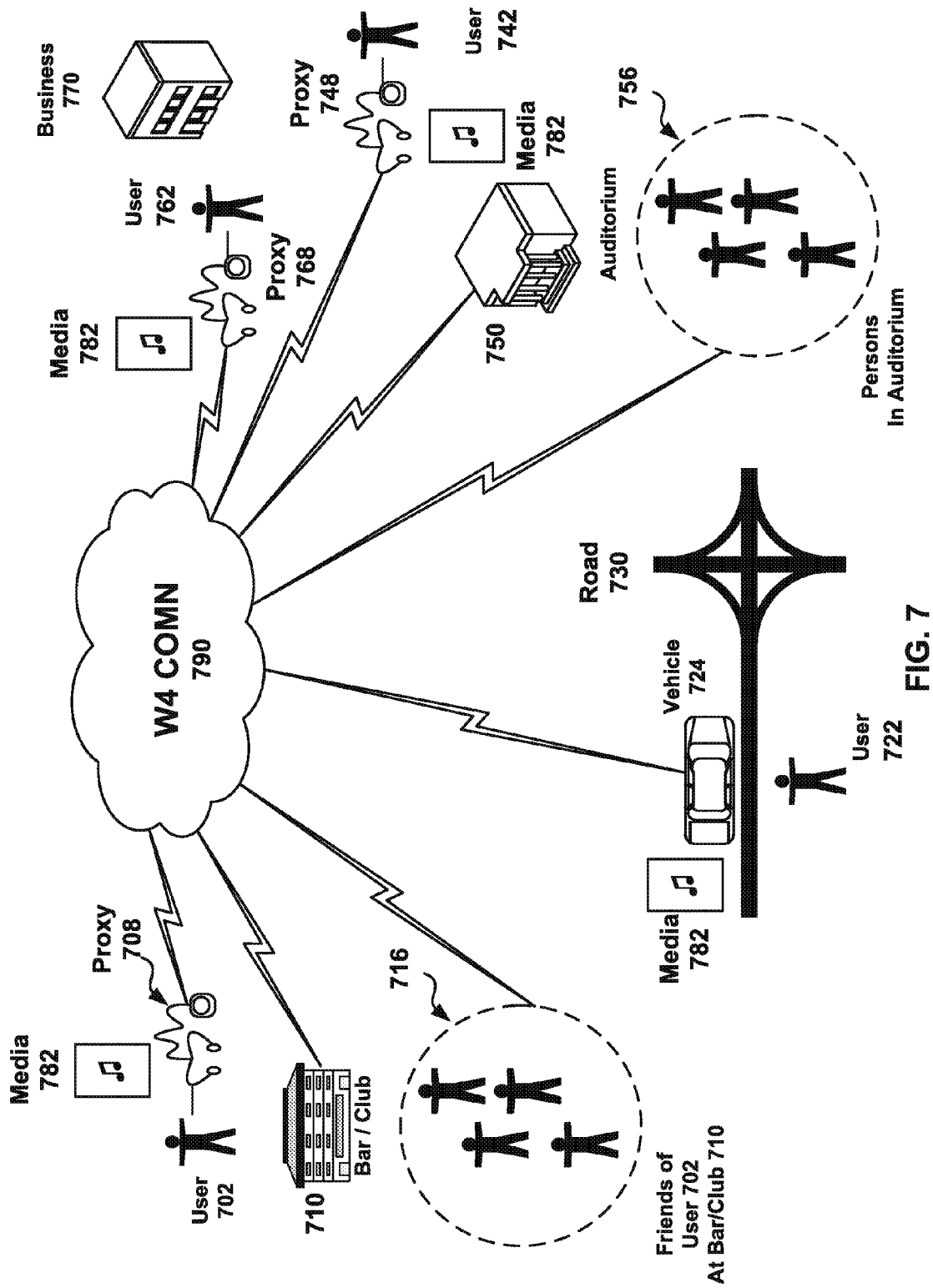
FIG. 7 illustrates one embodiment of the use of a W4 COMN for gathering data relating to media consumption.

FIG. 7 illustrates one embodiment of the use of a W4 COMN for gathering data relating to media consumption.

FIG. 7 shows a number of contexts in which a media object 782 is consumed. The contexts shown are illustrative, and not intended to represent the full range of contexts in which media can be consumed. The media object 782 can be any data object capable of being presented on an end user device. The media object 782 can be, without limitation, a file containing audio, visual, or audiovisual data. The file can represent, without limitation, a song or track, a portion of a song or track, an album or collection of songs, a music video or music video collection, a movie or movie clip, a speech or presentation or an informational video.

In FIG. 7, the media object is depicted as multiple instances in association with a number of user proxy devices that are capable of presenting the media object for consumption by one or more users. Each instance may represent an actual physical copy of the entire media object stored on a storage contained within, or assessable to, a proxy device. Alternatively, each instance could also represent a "virtual" copy of the media object. For example, all of the instances of the media object 782 could represent a connection to a streaming media server that streams a single physical copy of the media object from a streaming server to all of the proxy devices.

In one embodiment, for the purposes of reporting and analysis, all of the instances of the media object 782 are considered to be the same object, since each instance contains the same data. In another embodiment, media objects that are not identical on a binary level may still be considered the same object if the media contained within each object is substantially identical to every other object when presented to an end user. For example, a song may recorded once, and then translated to a variety of file formats, may be translated to the same file format on successive dates or by different sources, or may be compressed or encoded in a variety of ways. In addition, media objects that are identical on the binary level may sometimes be considered different objects if the meta-data or annotations of the media object are different and by different users.

In one context, user 702 is consuming the media object 782 using a portable media player 708 while present in a bar or club 710 at a specific time. A number of the user's friends 716 are also present in the bar, and it can be inferred that they are likely interacting with the user 702. In one embodiment, a network, such as a W4 COMN 790, tracks the location of the users 702 and 716 using proxy devices associated with each of the users. The W4 COMN 790 is further aware of the location of the bar/club 710 and can determine that all of the users 702 and 716 are present in the bar/club at a specific time. The W4 COMN 790 is further aware of substantially all the media objects consumed by the user 702 using the proxy device 708 over time and tracks the times each media object is consumed. The act of consuming the media object 782 can thus be associated with, without limitation, a specific time, a specific place (the bar/club 710), a specific social context (with a group of friends 716 present), and at least topical context (socializing or relaxing.)

In another context, user 722 is consuming the media object 782 using a vehicle media system 724 while commuting on a road 730 at a specific time. In one embodiment, a network, such as a W4 COMN, tracks the location of the user 722 using the vehicle media system 724 or another device associated with the user or the vehicle, such as a GPS system. The act of consuming the media object 782 can thus be associated with, without limitation, a specific time, a specific place (the road 730), a specific social context (alone), and at one least topical context (commuting or traveling.)

In another context, user 742 is consuming the media object 782 using a personal media player 748 while attending an event in an auditorium 750 at a specific time. A group of other users 756, most or all of whom may be unknown to the user 742, are also present in the auditorium 750 at the same time attending the same event. In one embodiment, a network, such as a W4 COMN, tracks the location of the users 742 and 756 using proxy devices associated with each of the users. The act of consuming the media object 782 can thus be associated with, without limitation, a specific time, a specific place (the auditorium 750), a specific social context (with a group of persons attending an event), and at least one topical context (the event.)

In another context, user 762 is consuming the media object 782 using a personal media player 768 while present in a business 770 (such as a retail outlet) at a specific time. In one embodiment, a network, such as a W4 COMN 790, tracks the location of the user 762 using proxy devices associated the users. The W4 COMN is further aware of the location of the business 770 and can determine that user 762 and any other users known to the network are present in the business at a specific time. The act of consuming the media object 782 can thus be associated with, without limitation, a specific time, a specific place (the business 770), a specific social context (alone), and at one least topical context (shopping.)

Figure 8:
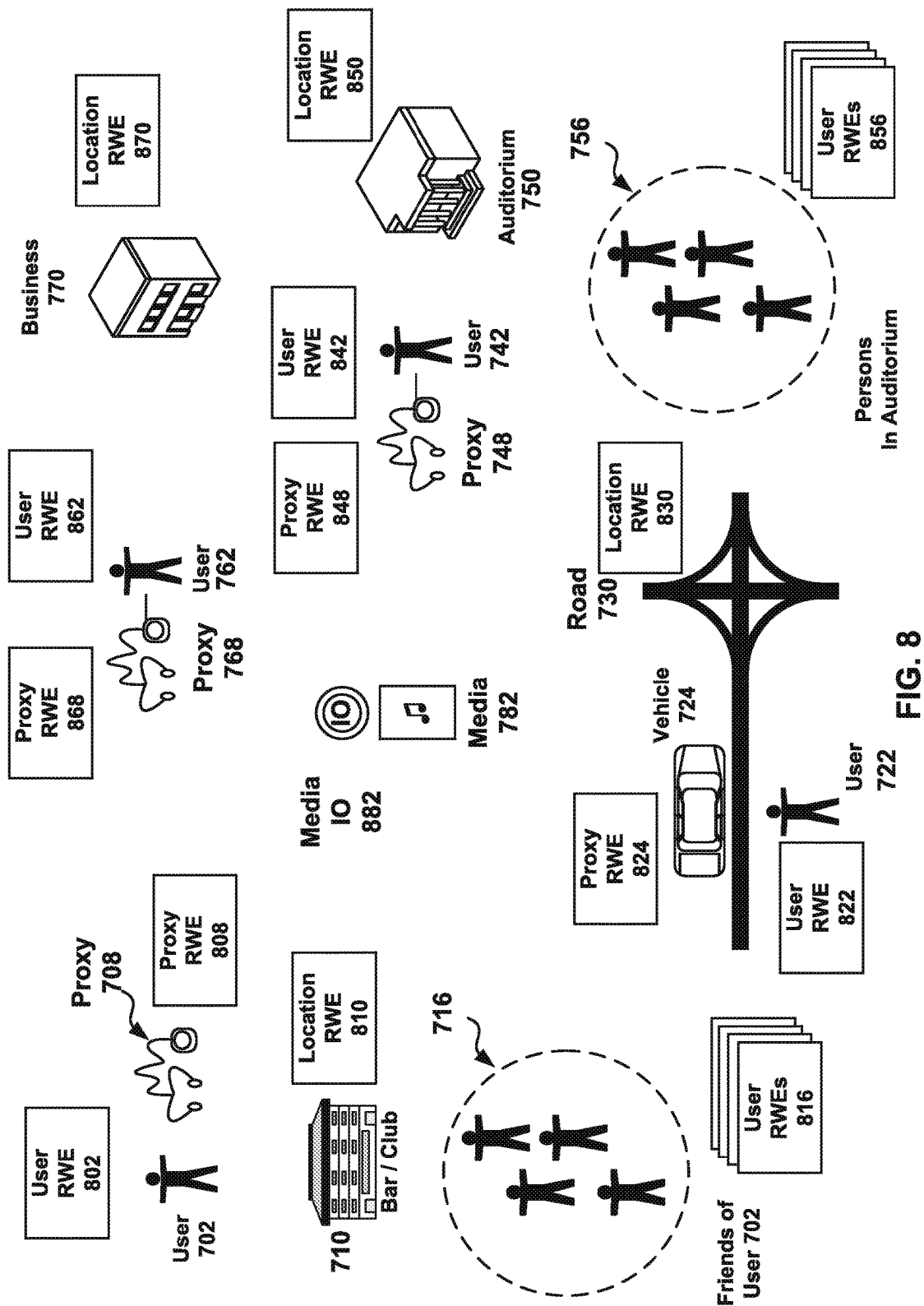
FIG. 8 illustrates one embodiment of how the users, devices and associated data objects.

FIG. 8 illustrates one embodiment of how the users, devices and associated data objects shown in FIG. 7 can be defined to a W4 COMN.

Users 702, 716, 722, 742, 756 and 762 are represented as user RWEs 802, 816, 822, 842, 856 and 862 respectively. The user's media devices 708, 724, 748 and 768 are represented as proxy RWEs 808, 824, 848 and 868 respectively. The bar/club 710, the road 730, the auditorium 750 and the business 770 are represented as location RWEs 810, 830, 850 and 870 respectively. The media object 768 is represented as a media IO 868. The W4 COMN collects spatial data, temporal data, RWE interaction data, IO content data (e.g., media data), and user data including explicitly-provided and deduced social and relationship data for all of the RWEs shown in FIG. 8.

Figure 9:
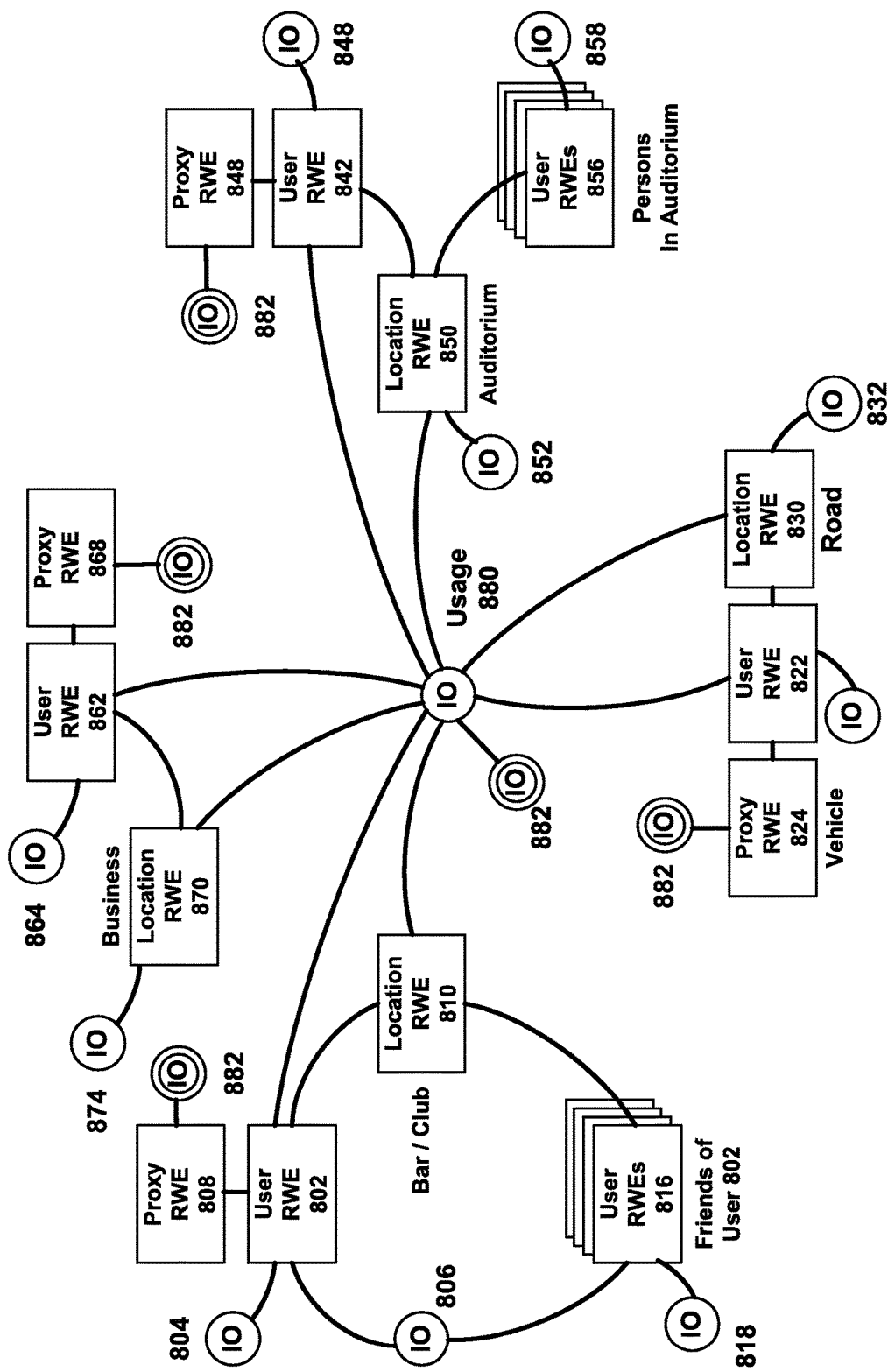
FIG. 9 illustrates one embodiment of a data model showing how the RWEs and IOs shown in FIG. 8 can be related to consumption data relating to a media object within a W4 COMN.

FIG. 9 illustrates one embodiment of a data model showing how the RWEs and IOs shown in FIG. 8 can be related to consumption data relating to a media object within a W4 COMN.

In one embodiment, one or more passive IOs 880 record consumption of a media object 882 on a network. In the illustrated embodiment, the usage IO 880 reflects at least four instances of consumption of the media object 882 as described above in relation to FIG. 7. The consumption IO 880 is directly related to the four consuming user RWEs 802, 822, 842 and 862 and four consumption location RWEs 810, 830, 850 and 870. In one embodiment, the date and time of each consumption event is stored by the usage IO. Each consumption event can be stored in a separate usage IO 880 related to the media object 882, or alternatively, a single usage IO can store multiple events.

Through associations maintained by the W4 COMN, the usage IO 880 is indirectly related to other data that further define the context of each instance of consumption of the media object.

In the instance where the media object 882 is consumed by user RWE 802 at the bar/club RWE 810, the bar/club RWE is further related to a group of user RWEs 816 present at the location at the time of the consumption event. The user RWEs 816 are further related to the consuming user RWE 802 thorough a social network. The consuming user RWE 802 and the user's friend RWEs 816 can be associated with other data unrelated to the specific consumption event, 804 and 818 respectively, that can provide further background to the consumption event. Such data can include, without limitation, user profile and interaction data.

In the instance where the media object 882 is consumed by user RWE 822 while commuting on the road represented by location RWE 830, the consuming user RWE 822 can be further associated with other data 828 unrelated to the specific consumption event that can provide further background to the consumption event. Such data can include, without limitation, user profile and interaction data as well as specific annotations or interaction data derived from the user's actual consumption of the media object 882. The location RWE 830 can be further associated with other data 832 unrelated to the specific consumption event that can provide further background to the consumption event. Such data can include, without limitation, descriptive information about the road, traffic, and traveling conditions at the time of the consumption event as well as historical data regarding past media object consumption events associated with this road or commuting route.

In the instance where the media object 882 is consumed by user RWE 842 at the auditorium RWE 850, the auditorium RWE is further related to a group of user RWEs 856 present at the location at the time of the consumption event. The auditorium RWE 850 is further related to a calendar of events 852 that can include, without limitation, data about events taking place at the auditorium at the time of the consumption event. The consuming user RWE 842 and user RWEs 856 can be associated with other data unrelated to the specific consumption event, 848 and 858 respectively that can provide further background to the consumption event. Such data can include, without limitation, user profile and interaction data.

In the instance where the media object 882 is consumed by user RWE 862 while present at a business location RWE 870, the consuming user RWE 862 can be further associated with other data 864 unrelated to the specific consumption event that can provide further background to the consumption event. Such data can include, without limitation, user profile and interaction data. The location RWE 870 can be further associated with other data 874 unrelated to the specific consumption event that can provide further background to the consumption event. Such data can include, without limitation, descriptive information about the business RWE 870, including the types of goods and services offered by the business, hours of operation and so forth.

The data relationships in the illustrated embodiment are exemplary, and do not exhaust the myriad number of entities and IOs that can be directly or indirectly related to consuming users or consumption locations. The consuming users or consumption locations can be indirectly related to a large, and potentially unbounded set of entities and data known to the network through various data relationships and at varying degrees of separation. For example, a consuming user's friend may patronize different businesses, travel on different roads, or attend different events than the consuming user.

In one embodiment, within a W4 COMN, the relationships shown in FIG. 9 are built and maintained by one or more correlation engines within a W4 engine which services the W4 COMN. The creation of such relationships may be automatic and part of the normal operation of the W4 COMN. Alternatively, such relationships can be created on demand.

Figure 10:
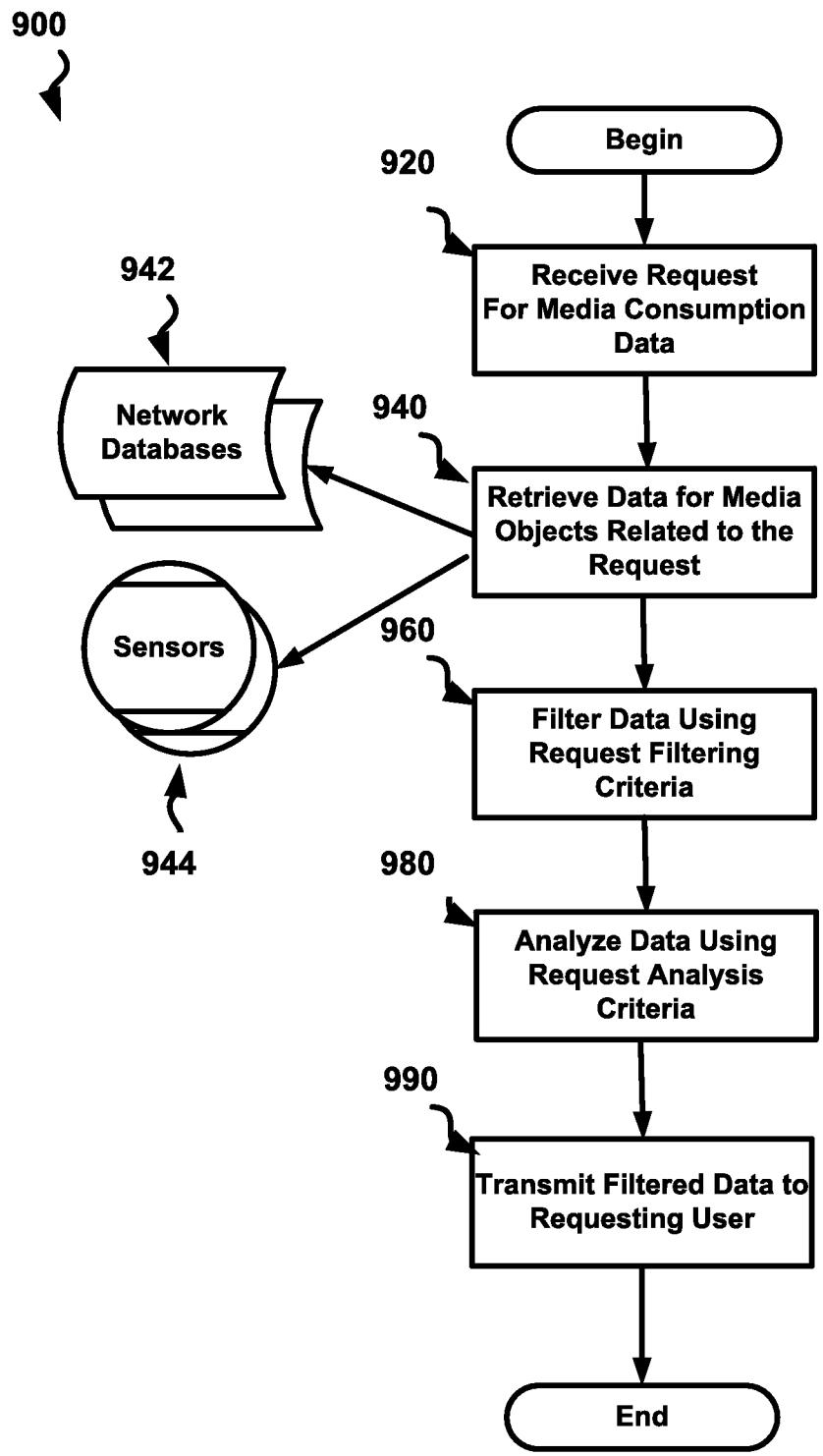
FIG. 10 illustrates one embodiment of a process of how a network, for example, a W4 COMN, can use temporal, spatial, and social data relating to consumption of media objects.

FIG. 10 illustrates one embodiment of a process 900 of how a network, for example, a W4 COMN, can use temporal, spatial, and social data relating to consumption of media objects.

A request is received 920, over a network, from a requesting user for data relating to consumption of media objects. The request comprises at least one reporting criteria. The reporting criteria comprise, at a minimum, an identification of one or more media objects. The identification of a media object can be for a specific file, for example, a specific file name, a file having a specific creation or update date and time, or a file having a specific digital signature. The identification of a media object can be for specific content, for example, a media objects relating to a specific song, track, image, movie clip or music video.

Alternatively, the identification of one or more media objects could be a generic identification that describes the physical attributes of a range of files or a range of content. For example, with respect to specific files, the identification could describe a set of file names using an enumerated list or wild card descriptors. With respect to content, the identification could list content attributes that define a finite set of content, such as, for example, songs composed by a specific composer or, in a more complex example, songs within a specific genre composed and performed by female musicians who were born in San Francisco in the 1960s.

Alternatively, the identification of one or more media objects could be a generic identification that describes consumption attributes of the media object. Consumption attributes can comprise spatial consumption attributes, for example, media consumed in a specific bar or restaurant or in a class of locations such as users home residence. Consumption attributes can comprise temporal consumption attributes, for example, media consumed at a specific time or on a specific date and time. Consumption attributes can comprise social consumption attributes, for example, media consumed when users are co-located with one or more friends, with one specific person or usually by themselves. Consumption attributes can comprise topical or logical consumption attributes representing the user's interests or activities, for example, media consumed by users that have surfing as a hobby or media consumed on a waterproof player while actually surfing.

More generally, an identification of one or more media objects can comprise any combination of any spatial, temporal, topical or social criteria that describe physical attributes of media objects, describe the content of media objects or describe consumption attributes of media objects.

In one embodiment, reporting criteria can additionally comprise filtration criteria for filtering media consumption data to limit and order the data returned to the end user. Filtration criteria can limit the type of data returned to the end user. In one embodiment, the filtration criteria can identify at least one type of data to be included in filtered data relating to consumption of the at least one media object, whereby all other types of data are excluded. For the purposes of this disclosure, the phrase "data type" is intended to be broadly construed as any type or category by which data can be logically grouped. For example, filtration criteria could specify that only the locations where a media object was consumed are to be returned in filtered data.

In one embodiment, filtration criteria can specify the format or order of data returned to the end user. For example, a filtration criteria could specify that data returned to the requesting user be sorted by date, time, and location, or that the data be returned in a specific file format, such as, for example, XML, HTML or text.

In one embodiment, reporting criteria can additionally comprise analysis criteria for analyzing media consumption data in simple or complex ways. In one embodiment, analysis criteria can identify at least one data type for which counts of occurrences of unique values of the data type are to be provided. For example, analysis criteria could specify that counts of consumption events for every unique location are to be returned to the requesting user. Analysis criteria can further specify if data is used to drive other kinds of statistical analysis. For example, criteria could specify that linear regression be performed on the consumption of a media object over time, for example, to project if usage is increasing or decreasing and how rapidly as well as among what types of users.

Spatial, temporal, topical, and social data related to the request reporting criteria are then retrieved 940 from databases 942 and sensors 944 available to the network. In the case of a W4, such data may include any data contained in other RWEs and IOs that are related, directly or indirectly, to consumption events for media objects within the scope of the request. Depending on the nature of the request, consumption data may potentially be returned relating to one media object or many media objects.

In one embodiment, preexisting data relationships such as those illustrated in FIG. 9 are used to retrieve data related to media object consumption events. In one embodiment, a global index of data available to the network is used to retrieve data related to media object consumption events.

The data relating to the request reporting criteria are then filtered 960 if criteria for filtering media consumption data have been provided. Where reporting criteria do not provide for filtration of consumption data, a default scheme could be used, for example, the date time and place of every consumption event could be returned ordered by date and time.

The filtered data relating to the request reporting criteria are then analyzed 980 if criteria for analyzing media consumption data have been provided. In one embodiment, if no criteria for analyzing media consumption data are provided, all filtered data relating all filtered data relating to the request reporting criteria can provided in detail with no analysis or summarization. Alternatively, the where reporting criteria do not provide for analysis of consumption data, basic statistics, such as usage event counts may be provided.

Finally, the filtered and analyzed consumption data is transmitted 990 to the requesting user. The data can be transmitted to the second user in any conventional or proprietary format that is viewable by the second user. For example, the data could be formatted as a text file, an XML file, or an HTML file.

Figure 11:
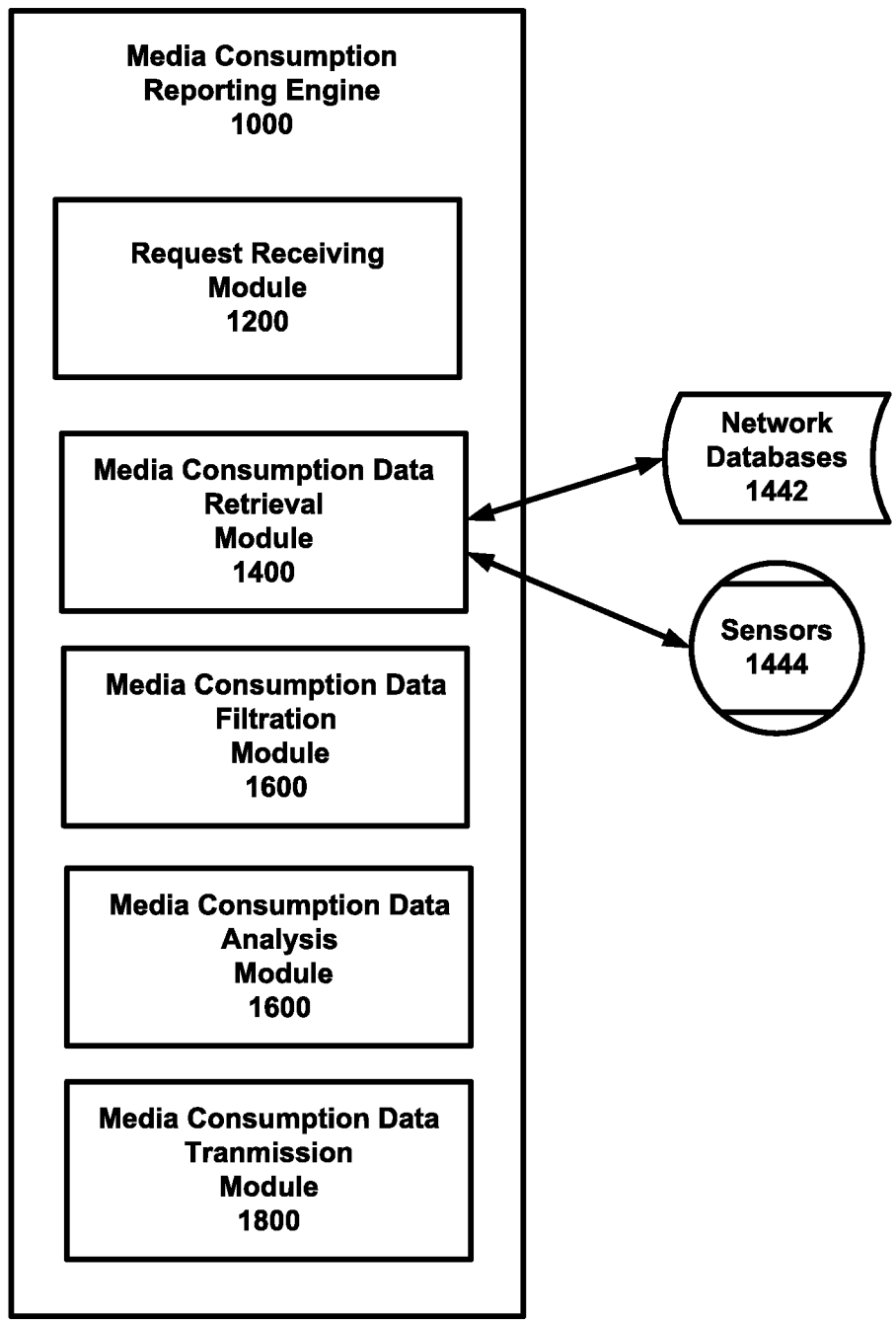
FIG. 11 illustrates one embodiment of a media consumption reporting engine that is capable of providing media consumption reporting within a network, for example, a W4 COMN.

FIG. 11 illustrates one embodiment of a media consumption reporting engine 1000 that is capable of providing media consumption reporting within a network, for example, a W4 COMN. The media consumption reporting engine 1000 includes a request receiving module that receives requests over a network from requesting user for data relating to consumption of media objects. The requests comprise at least one reporting criteria. The reporting criteria comprise, at a minimum, an identification of one or more media objects. Reporting criteria may additionally comprise filtration criteria and data analysis criteria.

The identification of a media object can be for a specific file or for specific content. Alternatively, the identification of one or more media objects could be a generic identification that describes the physical attributes of a range of files, a range of content or an identification that describes consumption attributes of media objects. More generally, an identification of one or more media objects can comprise any combination of any spatial, temporal, topical or social criteria that describe physical attributes of media objects, describe the content of media objects or describe consumption attributes of media objects.

The media consumption reporting engine 1000 further includes a media consumption data retrieval module 1400 that retrieves, for each request, spatial, temporal, topical, and social data related to request reporting criteria from databases 1442 and sensors 1444 available to the network. In the case of a W4, such data may include any data contained in other RWEs and IOs that are related, directly or indirectly, to consumption events for media objects within the scope of the requests. Depending on the nature of the request, consumption data may potentially be returned relating to one media object or many media objects.

In one embodiment, preexisting data relationships such as those illustrated in FIG. 9 are used to retrieve data related to media object consumption events. In one embodiment, a global index of data available to the network is used to retrieve data related to media object consumption events.

The media consumption reporting engine 1000 further includes a media consumption data filtration module 1600 that filters media consumption data retrieved by media consumption data retrieval module 1400 for every request containing filtration criteria. In one embodiment, the filtration criteria can identify data typed to be included in data filtered by the media consumption data filtration module 1600. In one embodiment, the filtration criteria can specify the order of at least one type of data in the filtered data. In one embodiment, if no criteria for filtering media consumption data are provided in a request, all data relating to every consumption event can provided in detail. Alternatively, the where reporting criteria do not provide for filtration of consumption data, a default scheme could be used, for example, the date time and place of every consumption event could be returned ordered by date and time.

The media consumption reporting engine 1000 further includes media consumption data analysis module 1800 that analyses media consumption data retrieved by media consumption data retrieval module 1400 for every request containing analysis criteria. In one embodiment, if no criteria for analyzing media consumption data are provided, all filtered data relating all filtered data relating to the request reporting criteria can provided in detail with no analysis or summarization. Alternatively, the where reporting criteria do not provide for analysis of consumption data, basic statistics, such as usage event counts may be provided. For example, in one embodiment, data analysis criteria can identify at least one data type for which counts of occurrences of unique values within the data type are to be provided. In another example, in one embodiment, data analysis criteria can identify at least one data type for which linear regression of data values of the at least one data type is to be performed. Alternatively, the where reporting criteria do not provide for analysis of consumption data, a default scheme could be used.

The location based media delivery engine 1000 further includes media consumption data transmission module 1900 that transmits filtered and analyzed consumption data is transmitted requesting users. The data can transmitted to the requesting user in any conventional or proprietary format that is viewable by the requesting user. For example, the data could be formatted as a text file, an XML file, or an HTML file.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

We claim:

1. A method comprising:
   receiving, at a computing device on a W4 Communication Network (W4 COMN), a request from a requesting user for consumption data relating to a media object, the request comprising an identification of the media object, said consumption data corresponding to rendering patterns of the media object by users on the network;
   automatically searching, via the W4 COMN computing device, a plurality of data sources on the network for said consumption data based on said request, said searching comprising searching for spatial data, temporal data, topical data and social data associated with the media object by implementing a global index of data available to the network, said global index comprising a global graph that automatically interrelates, via the W4 COMN computing device, entities known to the network with one another based on spatial data, temporal data, topical data and social data of consumption events of each entity;
   retrieving, via the W4 COMN computing device in response to said search, said spatial data, temporal data, topical data and social data related to said consumption data of the media object, said retrieved spatial data, temporal data, topical data and social data each comprising information associated with the rendering patterns of the media object on the W4 COMN;
   identifying, via the W4 COMN, at least one other media object based, at least in part, on the retrieved spatial data, temporal data, topical data and social data; and
   transmitting, the W4 COMN computing device, the spatial data, temporal data, topical data, and social data available to the W4 COMN relating to consumption of the media object to the requesting user, said transmission further comprising information associated with said identified other media object.

2. The method of claim 1 wherein the identification of the media object is an identification of a specific file.

3. The method of claim 1 wherein the identification of the media object is a definition of a set of content, such that spatial data, temporal data, topical data, and social data relating to a plurality of media objects relating to the set of content are retrieved and transmitted to the requesting user.

4. The method of claim 1 wherein the identification of the media object is a generic identification that describes the physical attributes of a file, such that spatial data, temporal data, topical data, and social data relating to a plurality of media objects having such physical attributes are retrieved and transmitted to the requesting user.

5. The method of claim 1 wherein the identification of the media object is a generic identification that describes consumption attributes of a file, such that spatial data, temporal data, topical data, and social data relating to a plurality of media objects having such consumption attributes are retrieved and transmitted to the requesting user.

6. The method of claim 1 wherein the identification of the media object is a generic identification that comprises spatial, temporal, topical and social criteria, such that spatial data, temporal data, topical data, and social data relating to a plurality of media objects matching such generic identification are retrieved and transmitted to the requesting user.

7. The method of claim 1 wherein the request further comprises filtration criteria and the method comprises the additional step of:
   filtering, via the W4 COMN computing device, the spatial data, temporal data, topical data, and social data relating to consumption of the media object using the filtration criteria, wherein the filtered data relating to consumption of the media object are transmitted to the requesting user.

8. The method of claim 7 wherein the filtration criteria identifies a type of data to be included in the filtered data relating to consumption of the media object, whereby all other types of data are excluded.

9. The method of claim 7 wherein the filtration criteria specifies the order of a type of data in the filtered data relating to consumption of the media object.

10. The method of claim 7 wherein if no filtration criteria are provided, default filtration criteria are used to the filter the spatial data, temporal data, topical data, and social data relating to consumption of the media object.

11. The method of claim 7 wherein the request further comprises data analysis criteria and the method comprises the additional step of:
    analyzing, via the W4 COMN computing device, the filtered spatial data, temporal data, topical data, and social data relating to consumption of the media object using the data analysis criteria, wherein the analyzed data relating to consumption of the media object are transmitted to the requesting user.

12. The method of claim 1 wherein the request further comprises data analysis criteria and the method comprises the additional step of:
    analyzing, via the W4 COMN computing device, the spatial data, temporal data, topical data, and social data relating to consumption of the media object using the data analysis criteria, wherein the analyzed data relating to consumption of the media object are transmitted to the requesting user.

13. The method of claim 12 wherein the data analysis criteria identifies a data type for which counts of occurrences of unique values of the data type are to be provided.

14. The method of claim 12 wherein the data analysis criteria identifies a data type for which linear regression of data values of the data type is to be performed.

15. The method of claim 12 wherein if no data analysis criteria are provided, default data analysis criteria are used to the analyzed spatial data, temporal data, topical data, and social data relating to consumption of the media object.

16. The method of claim 1 wherein at least one of the plurality of data sources comprises a social network.

17. The method of claim 1 wherein at least one of the plurality of data sources comprises a sensor.

18. The method of claim 17 wherein the sensor is not associated with a user.

19. The method of claim 1 wherein at least some of the spatial data, temporal data, topical data, and social data available to the W4 COMN relating to consumption of the media object the data comprises user profile data and interaction data.

20. The method of claim 1 wherein the spatial data, temporal data, topical data, and social data available to the W4 COMN relating to consumption of the media object the data comprises data in a plurality of data objects, wherein at least some of the plurality of data objects directly relate to consumption events relating to the media object and at least some of the plurality of data objects indirectly relate to consumption events relating to the media object.

21. The method of claim 1 wherein the at least some of the plurality of data objects are real-world entities (RWEs) and at least some of the plurality of data objects are information objects (IOs).

22. A W4 Communication Network (W4 COMN) computing device comprising:
a processor;
a non-transitory storage medium for tangibly storing thereon program logic for execution by the processor, the program logic comprising:
logic executed by the processor for receiving, at the W4 COMN computing device, a request from a requesting user for consumption data relating to a media object, the request comprising an identification of the media object, said consumption data corresponding to rendering patterns of the media object by users on the network;
logic executed by the processor for automatically searching, via the W4 COMN computing device, a plurality of data sources on the network for said consumption data based on said request, said searching comprising searching for spatial data, temporal data, topical data and social data associated with the media object by implementing a global index of data available to the network, said global index comprising a global graph that automatically interrelates, via the W4 COMN computing device, entities known to the network with one another based on spatial data, temporal data, topical data and social data of consumption events of each entity;
logic executed by the processor for retrieving, via the W4 COMN computing device in response to said search, said spatial data, temporal data, topical data and social data related to said consumption data of the media object, said retrieved spatial data, temporal data, topical data and social data each comprising information associated with the rendering patterns of the media object on the W4 COMN;
logic executed by the processor for identifying, via the W4 COMN, at least one other media object based, at least in part, on the retrieved spatial data, temporal data, topical data and social data; and
logic executed by the processor for transmitting, the W4 COMN computing device, the spatial data, temporal data, topical data, and social data available to the W4 COMN relating to consumption of the media object to the requesting user, said transmission further comprising information associated with said identified other media object.

23. The W4 COMN computing device of claim 22 wherein for at least some requests, the identification of the respective media object is an identification of a specific file.

24. The W4 COMN computing device of claim 22 wherein for at least some requests, the identification of the respective media object is a definition of a set of content, such that spatial data, temporal data, topical data, and social data relating to a plurality of media objects relating to the set of content are retrieved and transmitted to the requesting user.

25. The W4 COMN computing device of claim 22 wherein for at least some requests, the identification of the respective media object is a generic identification that describes the physical attributes of a file, such that spatial data, temporal data, topical data, and social data relating to a plurality of media objects having such physical attributes are retrieved and transmitted to the requesting user.

26. The W4 COMN computing device of claim 22 wherein for at least some requests, the identification of the respective media object is a generic identification that describes consumption attributes of a file, such that spatial data, temporal data, topical data, and social data relating to a plurality of media objects having such consumption attributes are retrieved and transmitted to the requesting user.

27. The W4 COMN computing device of claim 22 wherein for at least some requests, the identification of the respective media object is a generic identification that comprises spatial, temporal, topical and social criteria, such that spatial data, temporal data, topical data, and social data relating to a plurality of media objects matching such generic identification are retrieved and transmitted to the requesting user.

28. The W4 COMN computing device of claim 22 wherein for at least some requests, the filtration criteria identifies a type of data to be included in the filtered data relating to consumption of the respective media object, whereby all other types of data are excluded.

29. The W4 COMN computing device of claim 28 wherein for at least some requests, the filtration criteria specifies the order of the type of data in the filtered data relating to consumption of the respective media object.

30. The W4 COMN computing device of claim 22 wherein if no filtration criteria are provided for at least some requests, default filtration criteria is used to filter the spatial data, temporal data, topical data, and social data relating to consumption of the respective media object.

31. A non-transitory computer-readable storage medium for tangibly storing thereon computer readable instructions, that when executed by a processor associated with a computing device on a W4 Communication Network (W4 COMN), perform a method comprising:
receiving, at the W4 COMN computing device, a request from a requesting user for consumption data relating to a media object, the request comprising an identification of the media object, said consumption data corresponding to rendering patterns of the media object by users on the network;
automatically searching, via the W4 COMN computing device, a plurality of data sources on the network for said consumption data based on said request, said searching comprising searching for spatial data, temporal data, topical data and social data associated with the media object by implementing a global index of data available to the network, said global index comprising a global graph that automatically interrelates, via the W4 COMN computing device, entities known to the network with one another based on spatial data, temporal data, topical data and social data of consumption events of each entity;

retrieving, via the W4 COMN computing device in response to said search, said spatial data, temporal data, topical data and social data related to said consumption data of the media object, said retrieved spatial data, temporal data, topical data and social data each comprising information associated with the rendering patterns of the media object on the W4 COMN;

identifying, via the W4 COMN, at least one other media object based, at least in part, on the retrieved spatial data, temporal data, topical data and social data; and transmitting, the W4 COMN computing device, the spatial data, temporal data, topical data, and social data available to the W4 COMN relating to consumption of the media object to the requesting user, said transmission further comprising information associated with said identified other media object.

32. The non-transitory computer-readable storage medium of claim 31 wherein the identification of the media object is an identification of a specific file.

33. The non-transitory computer-readable storage medium of claim 31 wherein the identification of the media object is a definition of a set of content, such that spatial data, temporal data, topical data, and social data relating to a plurality of media objects relating to the set of content are retrieved and transmitted to the requesting user.

34. The non-transitory computer-readable storage medium of claim 31 wherein the identification of the media object is a generic identification that describes the physical attributes of a file, such that spatial data, temporal data, topical data, and social data relating to a plurality of media objects having such physical attributes are retrieved and transmitted to the requesting user.

35. The non-transitory computer-readable storage medium of claim 31, such that spatial data, temporal data, topical data, and social data relating to a plurality of media objects having such consumption attributes are retrieved and transmitted to the requesting user.

36. The non-transitory computer-readable storage medium of claim 31 wherein the identification of the media object is a generic identification that comprises spatial, temporal, topical and social criteria, such that spatial data, temporal data, topical data, and social data relating to a plurality of media objects having such consumption attributes are retrieved and transmitted to the requesting user.

37. The non-transitory computer-readable storage medium of claim 31 wherein the request further comprises filtration criteria and the method comprises the additional step of:

filtering, via the W4 COMN, the spatial data, temporal data, topical data, and social data relating to consumption of the media object using the filtration criteria, wherein the filtered data relating to consumption of the media object are transmitted to the requesting user.

38. The non-transitory computer-readable storage medium of claim 37 wherein the filtration criteria identifies a type of data to be included in the filtered data relating to consumption of the media object, whereby all other types of data are excluded.

39. The non-transitory computer-readable storage medium of claim 37 wherein the filtration criteria specifies the order of a type of data in the filtered data relating to consumption of the media object.

40. The non-transitory computer-readable storage medium of claim 37 wherein if no filtration criteria are provided, default filtration criteria are used to the filter the spatial data, temporal data, topical data, and social data relating to consumption of the media object.

41. The non-transitory computer-readable storage medium of claim 37 wherein the request further comprises data analysis criteria and the method comprises the additional step of:

analyzing, via the W4 COMN, the filtered spatial data, temporal data, topical data, and social data relating to consumption of the media object using the data analysis criteria, wherein the analyzed data relating to consumption of the media object are transmitted to the requesting user.

42. The non-transitory computer-readable storage medium of claim 31 wherein the request further comprises data analysis criteria and the method comprises the additional step of:

analyzing, via the W4 COMN, the spatial data, temporal data, topical data, and social data relating to consumption of the media object using the data analysis criteria, wherein the analyzed data relating to consumption of the media object are transmitted to the requesting user.

* * * * *